(12) United States Patent
Hiroshige et al.

(10) Patent No.: US 7,464,144 B2
(45) Date of Patent: Dec. 9, 2008

(54) METHOD FOR PROVIDING INFORMATION APPARATUS TOGETHER WITH SETUPS TRANSFER SERVICE

(75) Inventors: Yuzo Hiroshige, Tokyo (JP); Masakazu Sakaue, Atsugi (JP); Masashi Miyauchi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 27 days.

(21) Appl. No.: 09/974,097

(22) Filed: Oct. 9, 2001

(65) Prior Publication Data
US 2003/0041133 A1 Feb. 27, 2003

(30) Foreign Application Priority Data
Jul. 27, 2001 (JP) .............................. 2001-226985

(51) Int. Cl.
*G06F 15/177* (2006.01)
(52) U.S. Cl. .................. 709/220; 709/203; 709/217; 705/26
(58) Field of Classification Search ................ 709/232, 709/220–222, 223, 203, 217; 705/26
See application file for complete search history.

(56) References Cited

U.S. PATENT DOCUMENTS

| | | | | |
|---|---|---|---|---|
| 5,752,042 A | * | 5/1998 | Cole et al. ................. | 164/114 |
| 5,761,380 A | * | 6/1998 | Lewis et al. ................. | 706/47 |
| 5,771,354 A | * | 6/1998 | Crawford ..................... | 709/229 |
| 5,822,565 A | * | 10/1998 | DeRosa et al. ................ | 703/24 |
| 5,852,722 A | * | 12/1998 | Hamilton ..................... | 709/221 |
| 5,963,743 A | * | 10/1999 | Amberg et al. ............... | 717/147 |
| 5,991,543 A | * | 11/1999 | Amberg et al. ............... | 395/712 |
| 5,999,740 A | * | 12/1999 | Rowley ........................ | 5/227 |
| 6,038,379 A | * | 3/2000 | Fletcher et al. .............. | 709/230 |
| 6,151,643 A | * | 11/2000 | Cheng et al. .................. | 710/36 |
| 6,167,383 A | * | 12/2000 | Henson ........................ | 705/26 |
| 6,167,567 A | * | 12/2000 | Chiles et al. ................. | 717/173 |
| 6,256,668 B1 | * | 7/2001 | Slivka et al. ................. | 709/220 |
| 6,301,612 B1 | * | 10/2001 | Selitrennikoff et al. ...... | 709/220 |
| 6,484,315 B1 | * | 11/2002 | Ziese .......................... | 717/173 |
| 6,487,547 B1 | * | 11/2002 | Ellison et al. ................. | 707/2 |
| 6,587,869 B2 | * | 7/2003 | Sugauchi et al. ............. | 709/203 |
| 6,745,239 B1 | * | 6/2004 | Hubbard ...................... | 709/220 |
| 6,760,708 B1 | * | 7/2004 | Hubbard et al. .............. | 705/27 |

(Continued)

*Primary Examiner*—Lashonda T Jacobs
(74) *Attorney, Agent, or Firm*—Townsend and Townsend and Crew LLP

(57) ABSTRACT

In the case of providing a new information apparatus purchased for the replacement of or for the use in addition to a currently used information apparatus, the present invention enables a user to use the new information apparatus immediately after the delivery by providing the user with the new information apparatus in such a state that the setups and/or data of the currently used information apparatus are stored therein. The new information apparatus is delivered in the aforementioned state by: receiving from the user an order of a service for transferring setups, data and the like at the same time with receiving an order of the new information apparatus; transmitting from the user to an administrative information apparatus the setups, data and the like to be transferred by using a setups/data transfer-dedicated tool; and transmitting and setting up the contents transmitted to the administrative information apparatus to the new information apparatus to be produced according to the user's order. Thus, the user can operate the new information apparatus in the same environment as that of the currently used information apparatus when the user obtains the new information apparatus.

3 Claims, 21 Drawing Sheets

APPARATUS CONFIGURATION, SERVER AT MANUFACTURER

U.S. PATENT DOCUMENTS

| | | | |
|---|---|---|---|
| 6,910,076 B2* | 6/2005 | Lortz | 709/229 |
| 6,912,552 B2* | 6/2005 | Hubbard et al. | 707/204 |
| 6,985,876 B1* | 1/2006 | Lee | 705/27 |
| 7,146,612 B2* | 12/2006 | Sedlack | 717/178 |
| 2005/0125281 A1* | 6/2005 | Henrickson et al. | 705/10 |
| 2005/0144528 A1* | 6/2005 | Bucher et al. | 714/38 |
| 2005/0273488 A1* | 12/2005 | Ryan et al. | 709/203 |
| 2006/0179132 A1* | 8/2006 | Babilon et al. | 709/222 |

* cited by examiner

APPARATUS CONFIGURATION, SERVER AT MANUFACTURER

FIG.2 SYSTEM CONFIGURATION, SERVER AT MANUFACTURER

FLOW OF USE OF SERVER AT MANUFACTURER

INSTRUCTIONS FOR PRODUCTION AND DELIVERY ARE
DESCRIBED SEPARATELY

FIG.4

EXAMPLE OF IMAGE, IMAGE DISPLAYED ON SCREEN FOR PLACING ORDER (a)

IMAGE DISPLAYED ON SCREEN FOR ORDERING PERSONAL COMPUTER

| PRODUCT TYPE | UNIT | | |
|---|---|---|---|
| PC-P30800-H080-R0128 | 1 | | |
| OPTIONAL SERVICE | | | |
| SETUP TRANSFER SERVICE | ■ YES | □ NO | |
| DATA TRANSFER SERVICE | ■ YES | □ NO | |

[ APPLY (ORDER) ]  [ CANCEL ]

(b)

IMAGE DISPLAYED ON SCREEN FOR ORDERING PERSONAL COMPUTER

| PRODUCT TYPE | UNIT | SETUP TRANSFER SERVICE |
|---|---|---|
| PC-P30800-H080-R0128 | 1 | ■ YES |

[ APPLY (ORDER) ]  [ CANCEL ]

(c)

IMAGE DISPLAYED ON SCREEN FOR ORDERING PERSONAL COMPUTER

| PRODUCT TYPE | UNIT | DATA TRANSFER SERVICE |
|---|---|---|
| PC-P30800-H080-R0128 | 1 | ■ YES |

[ APPLY (ORDER) ]  [ CANCEL ]

(d)

IMAGE DISPLAYED ON SCREEN FOR ORDERING PERSONAL COMPUTER

| PRODUCT TYPE | UNIT | | |
|---|---|---|---|
| PC-P30800-H080-R0128 | 1 | | |
| OPTIONAL SERVICE | | | |
| SETUP TRANSFER SERVICE | ■ YES | □ NO | |
| DATA TRANSFER SERVICE | ■ YES | □ NO | |
| INFORMATION APPARATUS COLLECTION SERVICE | ■ YES | □ NO | |

[ APPLY (ORDER) ]  [ CANCEL ]

FIG.5

EXAMPLE OF IMAGE, IMAGE DISPLAYED ON SCREEN
FOR CONFIRMING RECEIPT OF ORDER (a)
FOLLOWING ORDER OF INFORMATION APPARATUS AND SERVICE HAS BEEN DULY RECEIVED.
ORDER-RECEIVING NUMBER: H0103092345

| PRODUCT TYPE | UNIT |
|---|---|
| PC-P30800-H080-R0128 | 1 |

ADDITIONAL SERVICE
· SETUP TRANSFER SERVICE    · DATA TRANSFER SERVICE

ADDITIONAL SERVICE (SETUP TRANSFER SERVICE/DATA TRANSFER SERVICE) MUST BE PERFORMED IN THE FOLLOWING MANNER.
CONNECT TO THE FOLLOWING ADMINISTRATIVE INFORMATION APPARATUS VIA THE FOLLOWING SETUP.
· TELEPHONE NUMBER TO BE CONNECTED: 0XX0-123-4567
· CONNECTION ID: ABOVE ORDER-RECEIVING NUMBER (INPUT HALF SIZE ALPHABETS AND NUMERALS)
· PASSWORD FOR CONNECTION: TELEPHONE NUMBER INPUTTED WHEN PLACING ORDER (INPUT HALF SIZE NUMERALS WITHOUT HYPHENS AND THE LAKE SUCH AS 1312345678)

[CONFIRM]

(b)
FOLLOWING ORDER OF INFORMATION APPARATUS AND SERVICE HAS BEEN DULY RECEIVED.
ORDER-RECEIVING NUMBER: H0103092345

| SIRIAL NUMBER | PRODUCT TYPE |
|---|---|
| 001 | PC-P30800-H080-R0128 |
| 002 | PC-P30800-H080-R0256 |
| : | : |

ADDITIONAL SERVICE
· SETUP TRANSFER SERVICE    · DATA TRANSFER SERVICE

ADDITIONAL SERVICE (SETUP TRANSFER SERVICE/DATA TRANSFER SERVICE) MUST BE PERFORMED IN THE FOLLOWING MANNER.
CONNECT TO THE FOLLOWING ADMINISTRATIVE INFORMATION APPARATUS VIA THE FOLLOWING SETUP.
· TELEPHONE NUMBER TO BE CONNECTED: 0XX0-123-4567
· CONNECTION ID: ABOVE ORDER-RECEIVING NUMBER (INPUT HALF SIZE ALPHABETS AND NUMERALS) + SERIAL NUMBER
· PASSWORD FOR CONNECTION: TELEPHONE NUMBER INPUTTED WHEN PLACING ORDER (INPUT HALF SIZE NUMERALS WITHOUT HYPHENS AND THE LIKE SUCH AS 0312345678)

[CONFIRM]

FIG.6

EXAMPLE OF DATABASE (a)

| ORDER-RECEIVING NUMBER | SERIAL NUMBER | PASSWORD | SETUP TRANSFER | DATA TRANSFER |
|---|---|---|---|---|
| H0103092345 |  | 0312345678 | 1 | 0 |
| H0103093456 | 001 | 04523456789 | 1 | 1 |
|  | 002 | 04523456789 | 0 | 1 |
|  | : | : | : | : |

FIG.7

EXAMPLE OF IMAGE, SETUP/DATA TRANSFER TOOL (a)
```
IMAGE DISPLAYED ON SCREEN
FOR SETTING UP SETUP/DATA TRANSFER

• SETUP
   FOLLOWING CONTENTS SET IN xxOS WILL BE TRANSFERRED.
      • REGISTER INFORMATION
      • NETWORK SETUP
      • APPLICATION
      • APPLICATION SETUP
• DATA
   FOLLOWING FOLDER WILL BE TRANSFERRD.
      • c:¥STD_DATA

[ ADD ]        [ START TRANSFER ]
```

(b)
```
CHECK AREA TO BE TRANSFERRED AND PRESS ADD BUTTON.
   ☑ c:¥_data
   ☑ c:¥_data2
   ☐ c:¥abc
   ☐ c:¥app
      c:¥data
   ☑ c:¥data¥123
      ⋮
                              [ ADD ]
```

(c)
```
[APP_LIST]
   APP-A  c:¥app¥app_a_Floder¥app_a.PRG
   APP-B  c:¥app¥app_b_Floder¥app_b.PRG
   APP-C  c:¥app¥app_c_Floder¥app_c.PRG
   ⋮
```

(d)

| APP. NAME | PLACE OF EXISTANCE OF SETUP FILE |
|---|---|
| APP-A | c:¥app¥app_a_Floder¥app_a.set |
|  | c:¥app¥app_a_Floder¥app_a2.set |
|  | c:¥OS_FOLDER¥APP-a_OS.set |
| APP-B | c:¥app¥app_b_Floder¥app_b.set |
| APP-C | c:¥app¥app_c_Floder¥app_c.set |
| ⋮ |  |

SERVER AT MANUFACTURER, FLOW OF ENCRYPTION

FIG.9

EXAMPLE OF IMAGE DISPLAYED ON SCREEN,
SETUP/DATA TRANSFER TOOL ENCRYPTION KEY INPUT (a)
CONTENTS THAT HAVE BEEN SET UP WILL BE TRANSMITTED AFTER BEING ENCRYPTED.

INPUT ENCRYPTION KEY
(DO NOT FORGET THIS KEY SINCE THE CONTENTS CANNOT BE DESCRYPTED WITHOUT THIS KEY).

ENCRYPT (b)
ENCRYPTED SETUP INFORMATION WILL BE DECRYPTED.

INPUT THE KEY INPUTTED FOR ENCRYPTION.

DECRYPT (c)
IMAGE DISPLAYED ON SCREEN FOR SETTING OBJECT FOR ENCRYPTION (SELECT CONTENTS TO BE ENCRYPTED)

· DATA
  FOLLOWING FOLDER WILL BE TRANSFERRED
  ☑ c:¥_data
  ☑ c:¥_data2
  ☑ c:¥data
  ☐ c:¥Std_Data

ENCRYPT

SERVER AT MANUFACTURER, FLOW OF ERASING DATA AFTER USER CONFIRMS TRANSFER CONTENTS

INSTRUCTIONS FOR PRODUCTION AND DELIVERY ARE DESCRIBED SEPARATELY

FIG. 12

EXAMPLE OF IMAGE DISPLAYED ON SCREEN, IMAGE DISPLAYED ON SCREEN FOR USER TO CONFIRM TRANSFER (a) IMAGE DISPLAYED ON SCREEN FOR INPUTTING CONFIRMATION OF TRANSFER OF SETUP/DATA AND THE LIKE

ORDER-RECEIVING NUMBER : H0103092345   SERIAL NUMBER : 123

FOLLOWING INPUT WILL CONFIRM COMPLETION OF TRANSFER OF SETUP/DATA AND THE LIKE AND THEN INFORMATION FOR THE TRANSFER STORED IN ADMINISTRATIVE INFORMATION APPARATUS WILL BE ERASED WITHOUT FALL.

THANK YOU FOR USING THIS SERVICE.

[CONFIRM COMPLETION OF TRANSFER SERVICE OF SETUP/DATA AND THE LIKE]   [REQUEST FOR RE-TRANSMISSION]

(b) IMAGE DISPLAYED ON SCREEN FOR SELECTING SETUP/DATA AND THE LIKE TO BE RE-TRANSMISSION

ORDER-RECEIVING NUMBER :   H0103092345   SERIAL NUMBER :  123

DESIGNATED SETUP/DATA WILL BE RE-TRANSMITTED.

- SETUP
- DATA

CHECKED SETUP WILL BE RE-TRANSMITTED.
- ☑ c:¥_data
- ☑ c:¥_data2
- ☑ c:¥data
- ☐ c:¥Std_Data CHECKED SETUP WILL BE RE-TRANSMITTED.
- ☑ c:¥_data
- ☑ c:¥_data2
- ☑ c:¥data
- ☐ c:¥Std_Data

[ALL SETUPS/DATA ARE RE-TRANSMITTED]   [SELECTED SETUP/DATA ARE RE-TRANSMITTED]   [CANCEL]

(c) IMAGE DISPLAYED ON SCREEN FOR INPUTTING CONFIRMATION FOR SETUP/DATA AND THE LIKE

ORDER-RECEIVING NUMBER :   H0103092345   SERIAL NUMBER :  123

FOLLOWING INPUT WILL CONFIRM COMPLETION OF TRANSFER OF SETUP/DATA AND THE LIKE AND THEN INFORMATION FOR THE TRANSFER STORED IN ADMINISTRATIVE INFORMATION APPARATUS WILL BE ERASED WITHOUT FALL.

PRESS THE BUTTON BELOW AFTER CONFIRMING THAT SETUP/DATA HAVE BEEN TRANSFERRED.

PRESS "CANCEL" TO PERFORM CONFIRMATION AND ERASE AT NEXT STARTING UP.

[CONFIRM COMPLETION OF TRANSFER SERVICE OF SETUP/DATA AND THE LIKE]   [CANCEL]

FIG.13

APPARATUS CONFIGURATION, USE OF SERVER AT CORPORATE BODY (a) USER OF CURRENT INFORMATION APPARATUS   MANUFACTURE OR THE LIKE

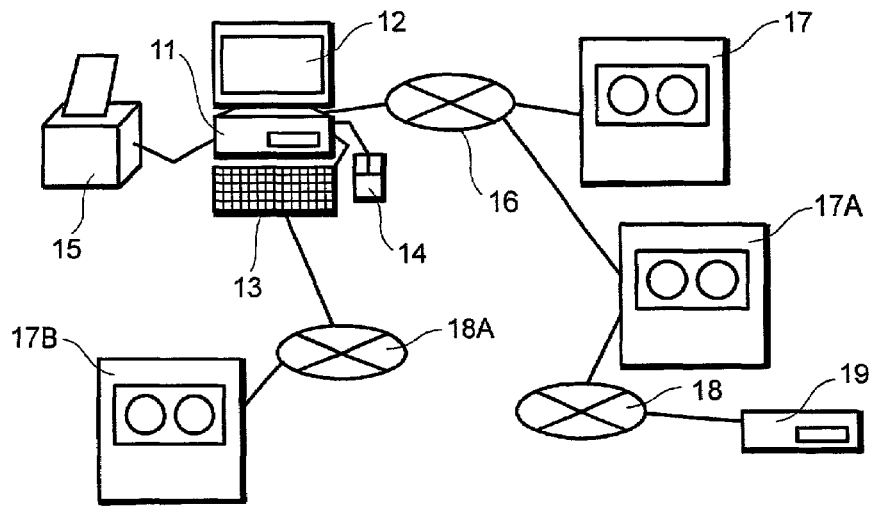

(b)
DESIGNATE STORAGE PLACE OF ADMINISTRATIVE INFORMATION APPARATUS OF YOUR COMPANY.

[　　　　　　　　　　　　　　　　] SELECT

[ DESIGNATED (START TRANSMISSION) ]

(c)
SELECT STORAGE PLACE OF ADMINISTRATIVE INFORMATION APPARATUS OF YOUR COMPANY.

Network Zone 1
　Machine 11
　Machine 12
Network Zone 2　　　　SELECT
　Machine 21
　Machine 22
　　⋮

FLOW OF USE OF SERVER AT CORPORATE BODY

SYSTEM CONFIGURATION, DATA CONVERSION DATABASE

SERVER AT MANUFACTURER, PROVIDED WITH DATA CONVERSION

INSTRUCTIONS FOR PRODUCTION AND DELIVERY ARE DESCRIBED SEPARATELY

APPARATUS CONFIGURATION, USE OF SERVER AT SALES OUTLET

FLOW OF USE OF SERVER AT SALES OUTLET

FIG.19

IMAGE DISPLAYED ON SCREEN FOR SELECTING APPLICATION EXISTING IN SETUP FILE (a)

IMAGE DISPLAYED FOR ASSOCIATING APPLICATIONS

| · LIST OF APPLICATIONS CURRENTLY USED | · LIST OF APPLICATIONS WHOSE SETUP FILES ARE REGISTERED | |
|---|---|---|
| WP-A-5 | WP-A-4 | WP-A-5 |
| SH-B-4 | WP-B-3 | WP-B-4 |
| PT-C-7 | SH-A-4 | SH-A-5 |
| EM-A-1 | SH-B-4 | SH-B-5 |
| WB-B-4 | PT-A-1 | PT-A-2 |
|  | PT-B-3 | PT-B-4 |
|  | PT-C-6 | PT-C-7 |
|  | EM-A-1 |  |
|  | EM-B-2 | EM-B-3 |
|  | WB-A-5 | WB-A-6 |
|  | WB-B-4 | WB-B-5 |

[ASSOCIATION]  [CANCEL]  [ASSOCIATION FINISHED]

FIG.20

ADVISING TO UPGRADE APPLICATION/APPARATUS CONFIGURATION (a)
IMAGE DISPLAYED ON SCREEN FOR ADVISING TO UPGRADE APPLICATION

ORDER-RECEIVING NUMBER : H0103092345　　SERIAL NUMBER : 123

WE OFFER NEWER VERSION OF APPLICATION YOU ARE CURRENTLY USING AS LISTED BELOW.
CHECK THE FOLLOWING CHECK BOXS IF YOU WISH TO UPGRADE THE APPLICATION.

| LIST OF APPLICATIONS CURRENTLY USED | NEWEST VERSION | PRICE OF UPGRADING | APPLY FOR UPGRADING |
|---|---|---|---|
| WP-A Ver. 5 | Ver. 6 | 6,000¥ | ☑ |
| SH-B Ver. 4 | Ver. 5.2 | 3,000¥ | ☐ |
| EM-A Ver. 1 | Ver. 1.2 | FREE | ☑ |

[ CARRY OUT UPGRADING OF APPLICATION ]　[ CANCEL ]

(b)

| APPLICATION NAME (VERSION NUMBER) | REQUIRED CPU (MHz) | REQUIRED STORAGE (MB) | REQUIRED HDD (GB) |
|---|---|---|---|
| MAIL-A 5.0 | 300 | 64 | 5 |
| MAIL-A 6.0 | 400 | 128 | 10 |
| Graph-B 2.0 | 1000 | 256 | 30 |
| Graph-C 4.0 | 1200 | 512 | 60 |
| Text-D 2.0 | 200 | 32 | 3 |
| : | : | : | : |

(c)
IMAGE DISPLAYED ON SCREEN FOR ADVISING CONFIGURATION OF INFORMATION APPARATUS

ORDER-RECEIVING NUMBER : H0103092345　　SERIAL NUMBER : 123

CAPACITY YOU ORDERED DOES NOT REACH THE REQUIRED LEVEL FOR USING THE FOLLOWING APPLICATION. WE OFFER YOU TO CHANGE TO AN APPARATUS CONFIGURATION HIGHER IN CAPACITY.
CHECK THE FOLLOWING CHECK BOX IF YOU WISH TO CHANGE CAPACITY.

| APPLICATION | REQUIRED CPU | YOUR ORDER | PRICE | APPLY |
|---|---|---|---|---|
| Graph-C 4.0 | 1200 | 800 | 8,000¥ | ☑ |

[ CHANGE APPARATUS CONFIGURATION ]　[ CANCEL ]

METHOD FOR PROVIDING INFORMATION APPARATUS TOGETHER WITH SETUPS TRANSFER SERVICE

CROSS-REFERENCES TO RELATED APPLICATIONS

This application claims priority from Japanese Patent Application No. 2001-226985, filed Jul. 27, 2001.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

Field of the Invention

The present invention relates to a method of electronic commerce to transfer setup information and other data when an existing information apparatus, such as a personal computer, is replaced or augmented by a newly purchased information apparatus.

When a new information apparatus, such as a personal computer, is purchased to replace or to use in addition to a currently used information apparatus, setup information or other data stored in the current apparatus are usually transferred to the new apparatus by the user or by a service provider after the user obtains the information apparatus. Some sales outlets provide such transfer service of setups or data, and a tool dedicated for transferring setups or data by directly connecting the current and the new information apparatuses is commercially available. In both of these cases, however, the transfer is invariably performed after the new information apparatus has been delivered to the user or the sales outlet.

Such transfer operations usually occur when the user cannot use the new information apparatus immediately after purchase. Moreover, it is impossible to take away the currently used product upon delivery of the new information because more than a several hours are needed to perform the transfer operation; therefore, such transfer operation is an obstacle for efficient recycling of the product.

BRIEF SUMMARY OF THE INVENTION

The present invention resolves these problems. Accordingly, the present invention provides a system capable of easily transferring setups or other data stored in a currently used product when a new information apparatus is purchased to replace or augment the currently used apparatus. The invention also enables the setups and data of the currently used information apparatus to be used in the new information apparatus at the time of delivery and enables a currently used information apparatus being replaced by the new information apparatus to be taken away by delivery personnel, thus realizing the efficient collection and recycling of equipment.

As such, the present invention provides efficient data transfer using a system whereby a user of the current apparatus and a manufacturer or a seller (hereinafter referred to as manufacturer/supplier") exchange the setups, data, and the like and that information is transferred to the new information apparatus prior to delivery of the system to the customer.

When placing the order for a new apparatus that will replace or be used with the current apparatus, the user requests "setup and data transfer service" from the manufacturer/supplier. The user transmits the setups, data and the like of the currently used information apparatus to the manufacturer/vendor. The manufacturer/vendor then transmits the received information to the new information apparatus for set up, and provides the user with the new apparatus with the setups, data, and the like are already installed and recorded.

Further, to implement the present invention steps are performed including: receiving order information that includes an order for an information apparatus and a request for a transfer service for setups and/or data sent from a user's current apparatus, receiving the setup information and/or data from the current apparatus, typically via a network; storing the received setups and/or data in an administrative apparatus; transmitting the stored dated to the new apparatus via the network; and then providing the user with the new apparatus.

In another embodiment, the method of the present invention also includes the steps of receiving the purchase order and setups/data transfer service request; encrypting the setups, setup information, and/or data received from the current apparatus; storing the encrypted setups and/or setup information, and/or data in an administrative apparatus; transmitting the encrypted setups and/or setup information, and/or data stored in the administrative apparatus to the newly ordered apparatus via a network or the like; and providing the user with the newly purchased apparatus with the encrypted setups and/or data stored therein, the encrypted setups and/or data being decryptable through use of a decryption key to be provided at start-up the new apparatus.

In addition, the method of the present invention further comprises transmitting to the new apparatus the setups and/or data received from the currently used apparatus and stored in the administrative apparatus and ensuring a user's data security by erasing the setups and/or data stored in the administrative apparatus after confirming that the transfer was successfully completed. The method may also include the steps of transmitting the setups and/or data of the current apparatus that are stored in the administrative apparatus to the new apparatus; receiving information confirming the completion of the transfer after providing the user with the new apparatus; and ensuring a user's data security by erasing the setups and/or data stored in the administrative apparatus once the transfer confirmation information is received.

Alternatively, the method and apparatus of the present invention may comprise the steps of receiving order information for a new apparatus and a request for transfer service, as described above; storing the setups and/or data received (usually via a network) from the current apparatus in an administrative computer; converting the stored setups and/or data based on conversion information for the setups and/or data; transmitting the converted setups and/or data to the new apparatus via a network or the like; and providing the user with the new information apparatus once the storage and conversion processes are completed.

The conversion method of the present invention is adapted to convert the setups and/or data of an application in the current apparatus into setups and/or data of an application to be installed in the new apparatus by consulting a setup conversion database provided in the administrative apparatus. Further, the method of the present invention comprises determining whether an application in the current apparatus is the latest version, using a function for managing versions of applications provided in the administrative apparatus; transmitting a recommendation for upgrading to the newer version of an application when an application transferred from the current apparatus to the newly purchased apparatus is not the most recent version; and converting the setups and/or data after receipt of information has purchased the newer application or upgrade and has requested installation.

The method the present invention includes a function provided in the administrative apparatus for determining the capacity required for running a new application that is to be installed in the new apparatus. When the hardware capacity of the new apparatus is smaller than the capacity required for operating the new application, as determined by the previous step, information is transmitted to the user recommending a change to a different apparatus or to another hardware configuration of the new apparatus that achieves the required capacity. When the user authorizes a change to an information apparatus having sufficient hardware capacity for operating the new application, the information is transmitted to the manufacturer/supplier and the setup information and/or data is converted.

Another embodiment of the present invention provides the application comparison, capacity determination and set up/data conversion for cases where the new apparatus contains a newer version of an application contained in the setups/data transmitted from the current apparatus, and that version requires a higher capacity than the transmitted version. The comparison and capacity determination functions, as well as the conversion operation, are carried out through the administrative apparatus, and are the same as described individually above. The user is informed that a newer version of a desired application resides on the new apparatus and that the newer version requires greater hardware capacity than is available in the new apparatus the user has ordered, and that if the user wishes to use the newer version of the application, a different apparatus or a different configuration of the new apparatus will be needed to supply sufficient capacity to run the application. A user deciding to use the newer version of the application sends order information changing the purchase to a higher capacity apparatus, and, upon receiving that information, the manufacturer/supplier converts the setups/data. apparatus A setup transfer method of the present invention includes the steps of transmitting order information for a new apparatus and requesting information for transfer service of setups and/or data from a user's current apparatus to an order receipt apparatus; transmitting, via a secure network, a portion of information included in the setups and/or data from the current apparatus that must not be disclosed to the public to a storage area of a server secured inside the company; transmitting to an administrative apparatus, via the network, a portion of information required for the set up that is included in the setups and/or data in the current apparatus; and transmitting to the new apparatus the setups and/or data stored in the storage area of the server in the user's company, by connecting the new apparatus to the server after delivery of the new apparatus in which the setups and/or data that were transmitted to the administrative apparatus have been stored and set up.

One process of the present invention comprises the steps of receiving order information for a new apparatus and request information for a transfer service for the setups and/or data transmitted from a user's current apparatus; storing in an administrative apparatus the setups and/or data received from the current apparatus via a network; transmitting the stored setups and/or data to the newly ordered apparatus via the network; and storing the setups and/or data in the new apparatus.

In another embodiment, the process of the present invention includes the steps of receiving order information for a new apparatus and request information for transfer service of setups and/or data sent from a user's current apparatus; storing in an administrative apparatus the encrypted setups and/or setups information, and/or data received from the current apparatus via a network; transmitting the encrypted setups and/or data stored in the administrative information apparatus to the new apparatus via the network; and storing the encrypted setups and/or data in the new apparatus in a state such that they can be decrypted by use of a decryption key to be provided at start up of the new information apparatus.

In another version, the process of the present invention comprises the steps of receiving order information for a new apparatus and requesting information for transfer service of setups and/or data sent from a user's current apparatus; storing in an administrative apparatus the setups and/or data received from the user's current apparatus, converting the setups and/or data transmitted to the administrative apparatus based on conversion information for the setups and/or data; transmitting the converted setups and/or data to the new apparatus via a network or the like; and storing the converted setups and/or data in the new apparatus.

BRIEF DESCRIPTION OF THE DRAWINGS

FIG. 4A is a diagram of an image displayed for ordering a service according to one embodiment of the present invention;

FIG. 4B is a diagram of an image displayed for ordering a service according to another embodiment of the present invention;

FIGS. 4C is a diagram of an image displayed for ordering a service according to another embodiment of the present invention;

FIG. 4D is a diagram of an image displayed for ordering a service according to another embodiment of the present invention;

FIG. 5A is a diagram of an image displayed for confirming receipt of an order according to one embodiment of the present invention;

FIG. 5B is a diagram of an image displayed for confirming receipt of an order according to another embodiment of the present invention;

FIG. 6 is a diagram of a database for managing receipts of orders according to one embodiment of the present invention;

FIG. 7A is a diagram of an image displayed by the setups/data transfer-dedicated tool according to one embodiment of the present invention;

FIG. 7B is a diagram of a displayed image, following the image in FIG. 7A, for selecting information to be transferred according to another embodiment of the present invention;

FIG. 7C shows an example of an application list displayed by the setups/data transfer-dedicated tool;

FIG. 7D shows an example of an application table displayed by setups/data transfer-dedicated tool;

FIG. 9A is a diagram of an image displayed by the setups/data transfer-dedicated tool according to another embodiment of the present invention.

FIG. 9B is a diagram of an image, following the image in FIG. 9B, displayed by the setups/data transfer-dedicated tool according to another embodiment of the present invention;

FIG. 9C is a diagram of an image displayed by the setups/data transfer-dedicated tool according to another embodiment of the present invention;

FIG. 12A is a diagram of an image displayed when requesting erasure of data stored at a transfer service, according to the fifth embodiment of the present invention;

FIG. 12B is a diagram of an image, following the image in FIG. 12A, displayed when requesting re-transmission of data by a transfer service;

FIG. 12C is a diagram of an image, following the image in FIG. 12C, displayed when confirming completion of data transfer and requesting erasure of data stored at a transfer service;

FIG. 13A is a diagram of a general configuration of an apparatus according to a sixth embodiment of the present invention;

FIG. 13B is a diagram of an image displayed on the apparatus in FIG. 13A;

FIG. 13C is a diagram of an image, following the image in FIG. 13B, displayed on the apparatus in FIG. 13A;

FIG. 19 is a diagram of an image displayed by a setups/data-transfer-dedicated tool for selecting an application from a setup file, according to one embodiment of the present invention;

FIG. 20A is a diagram of an image to be displayed when advising an application upgrade and showing database contents, according to the third embodiment of the present invention;

FIG. 20B is a diagram of an image displayed, following the image in FIG. 20A, according to the third embodiment of the present invention;

FIG. 20C is a diagram of an image displayed, following the image in FIG. 20B, according to the third embodiment of the present invention.

DESCRIPTION OF THE PREFERRED EMBODIMENT

Figure 1:
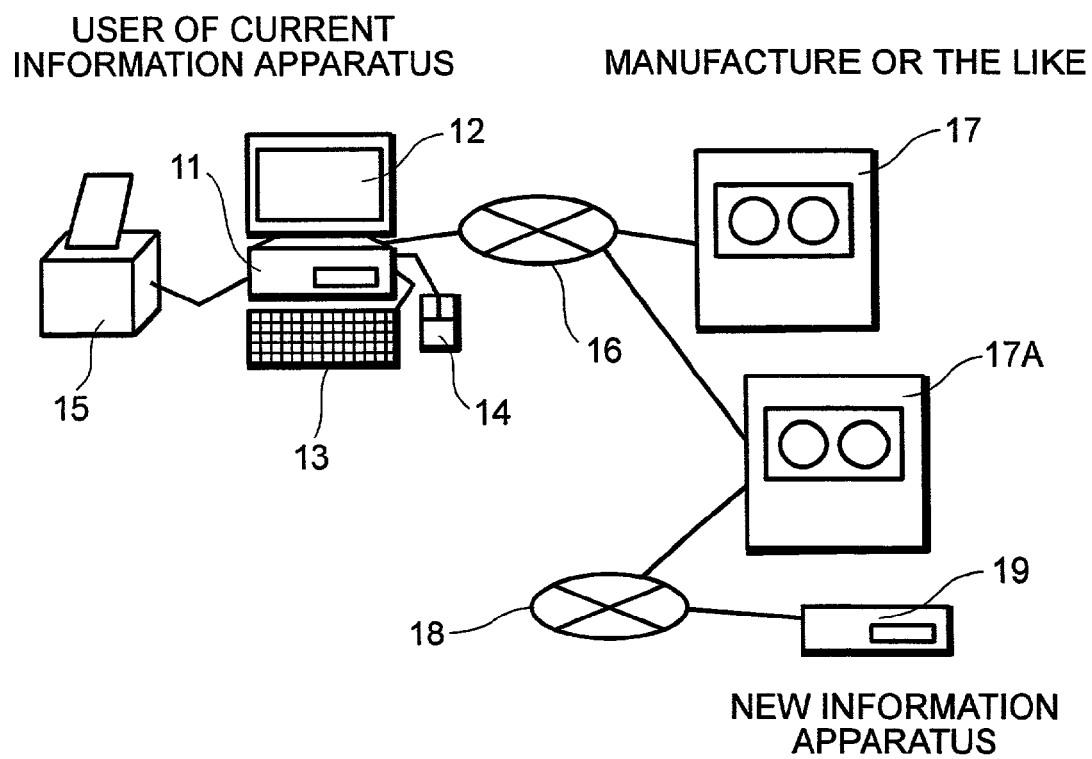
FIG. 1 is a diagram of a general configuration of an apparatus according to one embodiment of the present invention.

Embodiments of the present invention will hereinafter be described with reference to the attached drawings. FIG. 1 shows the general configuration of the present invention.

A system of the present invention comprises a current information apparatus 11 (hereinafter "current apparatus 11"), such as a personal computer currently used by a user, the apparatus including a display device 12, such as a monitor; an input device, such as a keyboard 13 and mouse 14; an output device, such as a printer 15; an order-receiving information apparatus 17 (hereinafter "order receipt apparatus 17") for managing order information; an administrative information apparatus 17A (hereinafter "administrative apparatus 17A") for managing transfer information; a new information apparatus 19 (hereinafter "new apparatus 19") provided at a manufacturer/supplier; a network 16, such as a telephone line for connecting the current information apparatus 11 and the order-receipt apparatus 17; and an internal network 18, such as a LAN for connecting order receipt apparatus 17, administrative apparatus 17A, and new apparatus 19. Current apparatus 11, order receipt apparatus 17, administrative apparatus 17A and new apparatus 19 are shown as connected on a one-to-one basis in FIG. 1; however, a plurality of apparatuses may be used for each of the apparatuses 17, 17A and 19. Further, order receipt apparatus 17 and apparatus administrative apparatus 17A are shown separately in FIG. 1; however, it is possible to use a single apparatus for achieving both the functions of apparatus order receipt apparatus 17 and the functions of administrative apparatus 17A. Network 16 and internal network 18 are not necessarily connected to each other via a wire communication. Specifically, it is possible to realize the present system by using a storage medium located on the manufacturer/supplier's premises in place of internal network 18.

Figure 2:
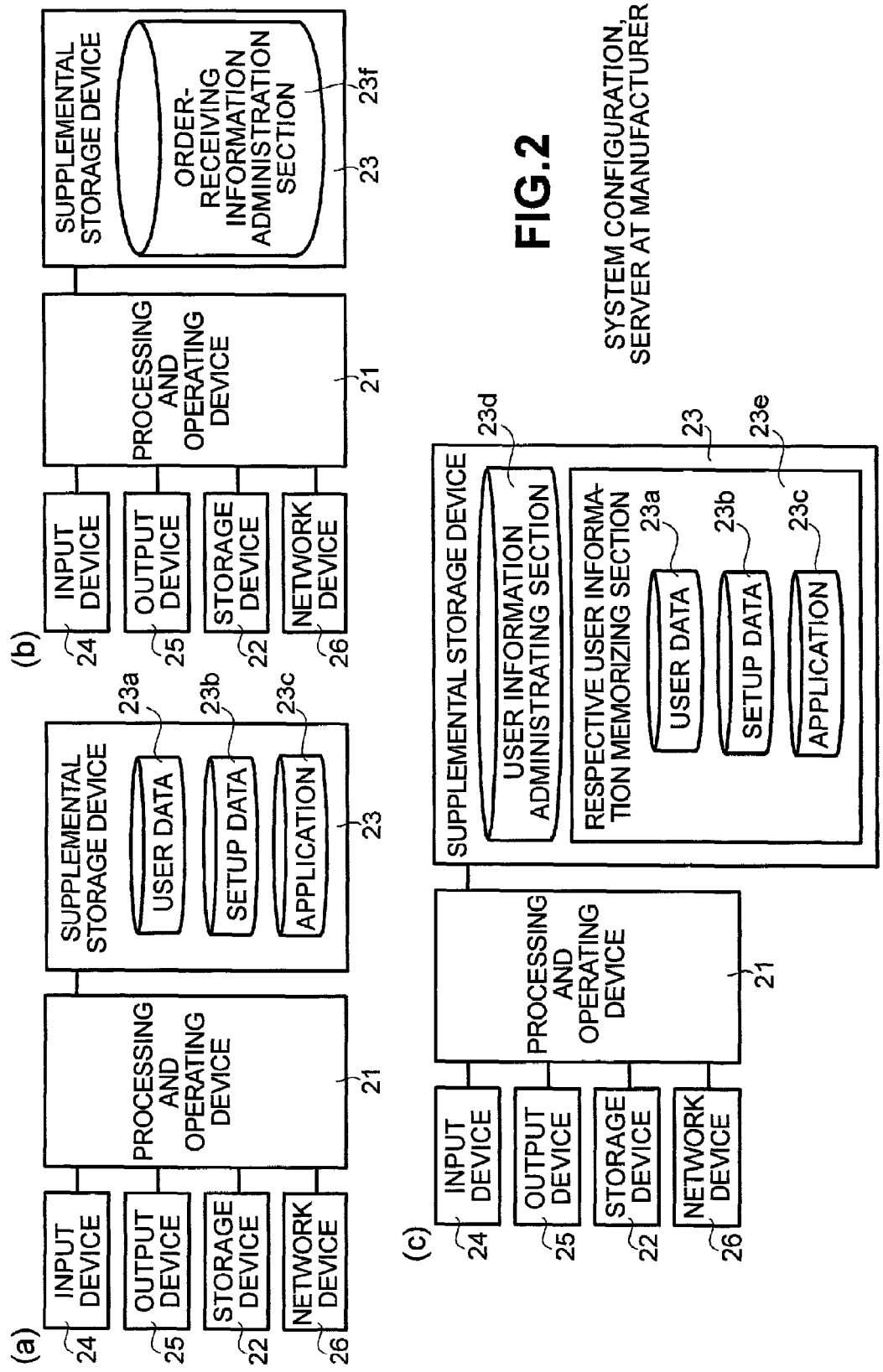
FIG. 2A is a diagram of a system configuration according to one embodiment of the present invention.
FIG. 2B is a diagram of a system configuration according to another embodiment of the present invention.
FIG. 2C is a diagram of a system configuration according to another embodiment of the present invention.

FIG. 2A shows a typical system configuration for an end user's current apparatus according to the present invention. The system comprises a processing and operating device 21, such as a CPU typically provided in an information apparatus a storage device 22, such as a semiconductor memory; a supplemental storage device 23, such as a hard disk drive (HDD); an input device 24, such as keyboard 13 and mouse 14; a display device 12 such as a monitor; an output device 25, such as a printer; and a network device 26, such as a modem or a LAN card. User data 23a, setup data 23b, application data 23c and the like are stored in memory in supplemental storage device 23.

FIG. 2B shows a typical system configuration of the order receipt apparatus 17 of the manufacturer/supplier according to the present invention. The system comprises a processing and operating device 21, such as a CPU typically provided in an information apparatus a storage device 22, such as semiconductor storage; a supplemental storage device 23, such as an HDD; an input device 24, such as a keyboard 13 and mouse 14; a display device 12, such as a monitor; an output device 25, such as a printer; and a network device 26, such as a modem or a LAN card. Further, supplemental storage device 23 is provided with an order receipt administration section 23f that holds received order information, including a service menu.

FIG. 2C shows a typical system configuration for the administrative apparatus 17A of the manufacturer/supplier according to the present invention. The system comprises a processing and operating device 21, such as a CPU typically provided in an information apparatus; a storage device 22, such as a semiconductor; a supplemental storage device 23, such as an HDD; an input device 24, such as a keyboard 13 and mouse 14; a display device 12, such as a monitor; an output device 25, such as a printer; and a network device 26, such as a modem or a LAN card. In this configuration, supplemental storage device 23 comprises a user information administrating database 23d and a respective user information storage section 23e. The respective user information storage section 23e comprises three storage sections; a user data storage section 23a that holds data for each user, a setup data storage section 23b that holds the setup data for each user's information apparatus, and an application data storage section 23c that holds application data installed in the each user's information apparatus.

Figure 3:
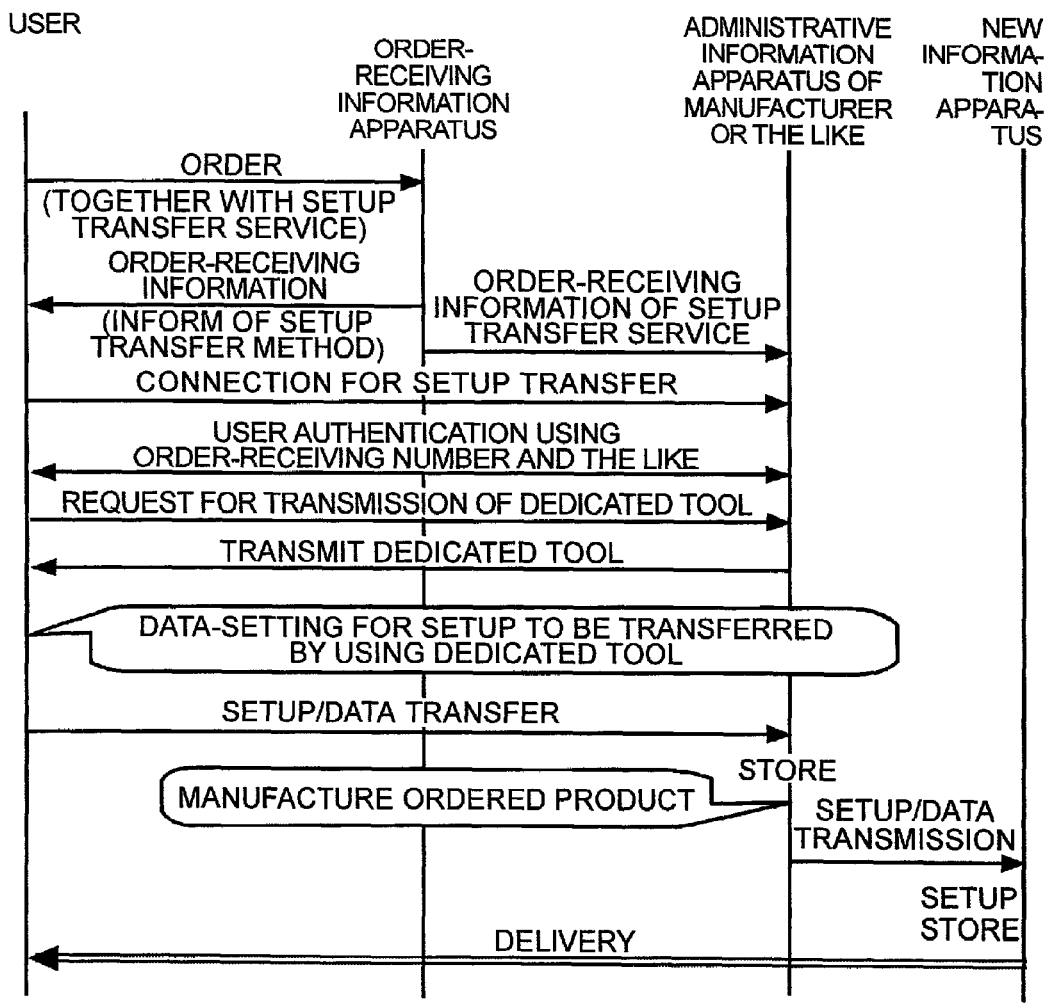
FIG. 3 is a diagram of a process flow between a use and a manufacturer according to one embodiment of the present invention.

FIG. 3 shows the general process flow of the present embodiment. The user of the current apparatus sends an order to order receipt apparatus 17 of the manufacturer/supplier for purchasing a new apparatus to replacement of or augment the current apparatus. The "user" is not necessarily the direct user. For example, when a company orders multiple information apparatuses at a time through its information administration department, the person in charge of the administration department, or the person in charge of the arrangement, is the "user" of the apparatus. At this time, the user requests service for setup information transfer or data transfer as shown in FIGS. 4A to 4D. FIG. 4A is an example of a request for both setup information transfer service and data transfer service, and the performance of those services; FIG. 4B is an example of requesting only the setups transfer service and the performance of that service; FIG. 4C is an example of requesting only the data transfer service and the performance of that service; and FIG. 4D is an example of ordering a new information apparatus.

In addition, it is possible to send the above requests via a network 16 at the same time as the new apparatus purchase order; however, such requests also may be sent by another method, for example, by using a phone or a facsimile machine and linking the order to the request by using the order number. Further, the requests can be sent separately from the purchase order as an additional order. Of course, the requests must be sent before shipment of the new apparatus from the manufacturer/supplier. The order method described above can be realized by indicating the presence or absence of the setups/data transfer service on a typical purchase order. In addition, the order is not necessarily sent directly to apparatus order receipt apparatus 17 of the manufacturer/supplier, and the order can be sent through a sales outlet or the like. In that case, the request for setups/data transfer service is sent with the purchase order for the new apparatus, using an ordering terminal at the sales outlet.

Order receipt apparatus 17 registers a purchase order for a new apparatus together with a request for setups/data transfer service received thereby, and the order-receipt information (including the setups/data transfer service) is sent to the user. The user is informed of the process for receiving the setups/data transfer service and is provided with typical order-receipt information, as shown in FIGS. 5A and 5B It is important to submit a number such as a purchase order number for specifying the user at this point. Further, when a purchase order for a plurality of new apparatuses to replace or augment the current apparatuses is received, each of the new apparatuses is given a serial number, as shown in FIG. 5B. Setup information transfer for each of the new apparatuses uses the purchase order number and the individual apparatus serial numbers. FIGS. 5A and 5B, each illustrates an example of directly connecting a telephone line to administrative apparatus 17A receiving the setups/data transfer service. A communication tool, such as a modem or the like, may be used for providing a connection to administrative apparatus 17A. In this case, a user identification number, such as the purchase order number, and the telephone number used when the order was placed become the means for confirming that the connection is from the user. The user is informed about the use of the numbers. As an example of another method, a user may use a network such as the Internet to connect to administrative apparatus 17A. In this case, user identity is confirmed by inputting the user identification number and a password.

Order-receipt apparatus 17 transmits the following information to the administrative apparatus 17A: the purchase order number for the setups/data transfer service; the user's identification number, such as a telephone number; and purchase order-information such as "setups only," "data only," or "both setups and data," immediately before or after requesting the setups/data transfer method. Administrative apparatus 17A stores the information in the user information management database 23d contained therein. An example of the data components of user information management database 23d is shown in FIG. 6A. The purchase order number is shown in the first column; the serial number is shown in the second column; a password for connection, such as a telephone number, is shown in the third column; and order-receipt transfer service contents for each of the users (or serial numbers) are shown in the fourth and fifth columns. In addition, order-receipt apparatus 17 and administrative apparatus 17A are separate information apparatuses in this embodiment; however, they may not necessarily be separated. The same processing tasks can be carried out configured using a single apparatus.

The user connects via network 16 to a connection point for the setups/data transfer whose contents are transmitted from the order-receipt apparatus 17A of the manufacturer/supplier as shown in FIGS. 5A and 5B. In this example, current apparatus 11 and administrative apparatus 17A perform user verification by using the items (or the like) shown in FIGS. 5A and 5B. After completing user verification, the user uses current apparatus 11 to request administrative apparatus 17A to download a setups/data-transfer-dedicated tool (hereinafter "the dedicated transfer tool"). The administrative apparatus transmits the dedicated transfer tool in response to the request from current apparatus 11. Although the dedicated transfer tool is downloaded from administrative apparatus 17A in this embodiment; the downloading is not limited to the above method, and the dedicated tool may be installed in the current apparatus from other apparatuses or may be installed before the point of sale.

Next, details of the dedicated transfer tool will be described. This dedicated tool automatically extracts information such as setup configurations, data, and so, on from current apparatus 11, according to the user's instructions, for transfer to new apparatus 19. By way of example, FIG. 7A shows an image displayed upon starting current apparatus 11. Transferable setups are defined according to the functions of the dedicated tool. The displayed contents of this example include an application, the setup contents of the application, the setup contents of related apparatuses, such as a network, etc. These setups are administrated by an OS (Operating System) of either the current apparatus or the application, and it is possible to automatically extract the setups by reading a specific file in a folder managed by the OS or by reading a specific file used by the application.

In a specific OS, setup information regarding the OS typically exists in a specific folder ("OS_FOLDER") for example, as a file ("OS.Set," for example) for storing the configuration information. (Note that a plurality of "OS_FOLDER" and "OS.Set" may exist in some cases; however, in such cases, it is possible to realize the same function described below by carrying out the same processes with respect to each of the folders known in advance of the processing.

For example, an application used in the current apparatus is found at "OS.Set" in "OS_FOLDER" as an entry "APP_LIST". By reading such entries, it is possible to identify the name of the application that is installed in the current apparatus, the file's location, and so on. FIG. 7C shows an example of the expression of "APP_LIST". In the example, it is indicated that "APP_A", "APP_B", and "APP_C" are registered in "APP_LIST" and that the locations of the applications are managed. It is possible to automatically fetch the applications used in the current apparatus by reading the entry information.

A setup file for each of the applications is typically located in the same location as the application, or in a specific folder ("OS_FOLDER," for example) under a specific name. (For example, a setup file of "APP-A" is referred to as "APP-A.Set"). Thus, it is possible to obtain a setup of the application by searching the folder containing the application (for example, "c:appapp_a_Folder"), or the specific folder in the OS ("OS_FOLDER"), and then searching for "APP-A.Set" or a file similar thereto (for example, "APP-A-5.Set," which includes the version number 5 in addition to "APP-A.Set"). If the application is a well-known one, it is possible to easily obtain the setup file when extracting the name of the application since the application has a table containing the application name, the location of its setup file, and the name of the setup. (An example of this table is shown in FIG. 7D). In the application specifying process of this example, a list of applications located in the setup file is displayed and an operator selects one of them in addition to the processing described above.

An example of an image displayed in this case is shown in FIG. 19A. In this example, it is possible to obtain the setup file by pairing, on the image shown in FIG. 19A, an application from the list in the setup file with a specific application whose setup file information is registered in the dedicated tool. An example of this association process includes a process wherein an association operation is carried out by selecting both the application in the setup file and the application in the dedicated tool on the image shown in FIG. 19A and then pressing the association button; a list of applications whose setup file information is registered in the dedicated tool is displayed (corresponding to the right hand side of FIG. 19A) when an application in the setup file is selected and then an operator selects an application from the list corresponding to the selected application and like processes. These processes are typically carried out in various tools currently available on the market and no special tool is required. Furthermore, "CANCEL" shown in FIG. 19A means that the association operation is to be canceled and "ASSOCIATION FINISHED" is used when the association processes for all the applications are completed.

As another method of extracting an application setup file of, it is possible to distinguish setup files by successively starting up the applications that are found by the above-described search and then eliminating files that, apparently, are not setup files (for example, "app-a.prg" that is distinguishable as a program file) from files that are read and written by the applications when the applications are started or completed, followed by recognizing the rest of the files as setup files. The transfer process for the setup file of an application is described below.

When a version of an application is common current information apparatus 11 and new apparatus 19, the file wherein the setup contents (extracted as described above) are recorded may be copied via network 16 to a folder in the new apparatus that is the same as that of the current information apparatus. In the case where versions of applications or the like are different from each other, it is possible to carry out the transfer process by using a setups conversion database 23g that will be described later in this specification.

Further, in the case of transferring data, a standard data storage area of an OS is displayed as being defaulted. However, considering that a user may store data, or the like that the user desires to transfer in other areas, it is possible to add such locations to the data to be transferred in a convenient manner. The user presses an "add" button to display an image for selecting a structure of the current apparatus 11, as shown in FIG. 7B and then the user highlights the area desired for transfer and presses the "add" button.

The transfer information for setups, data, and the like to be transferred to administrative apparatus 17A via e-network 16 from the current apparatus is transmitted when the user presses the "start transfer" button shown in FIG. 7A. Administrative apparatus 17A stores the transfer information in user data storage section 23a, setup data storage section 23b and application storage section 23c in respective user information storage section 23e. It is preferred that the system has a function to transfer an application from current apparatus 11 to new apparatus 19 in accordance with the license for use of the application. More specifically, this function can be realized by adding an operation for erasing an application from the current apparatus upon confirming the completion of a transfer of the application. In this case, execution files, folders containing the execution files and the like are erased to implement the function. The operation is described below.

Transferring setups and data is described above, in one example. A portion of the dedicated tool, however, that selects data may be eliminated when transferring only the setups, and a portion of the dedicated tool that selects setups may be eliminated in the case of transferring only the data. The rest of the operation is the same as described above, in both cases.

Next, when producing the newly ordered information apparatus, administrative apparatus 17A transmits, sets up and stores the contents stored in user data storage section 23a, the setup data storage section 23b and the application storage section 23c in respective user information storage section 23e, with respect to the ordered information apparatus, and then the new apparatus is delivered to the user.

According to the present invention, since setups or data of user's specifications are already transferred to the new apparatus when the new information apparatus is delivered to the user, it is possible to use the new apparatus immediately after the delivery.

Figure 8:
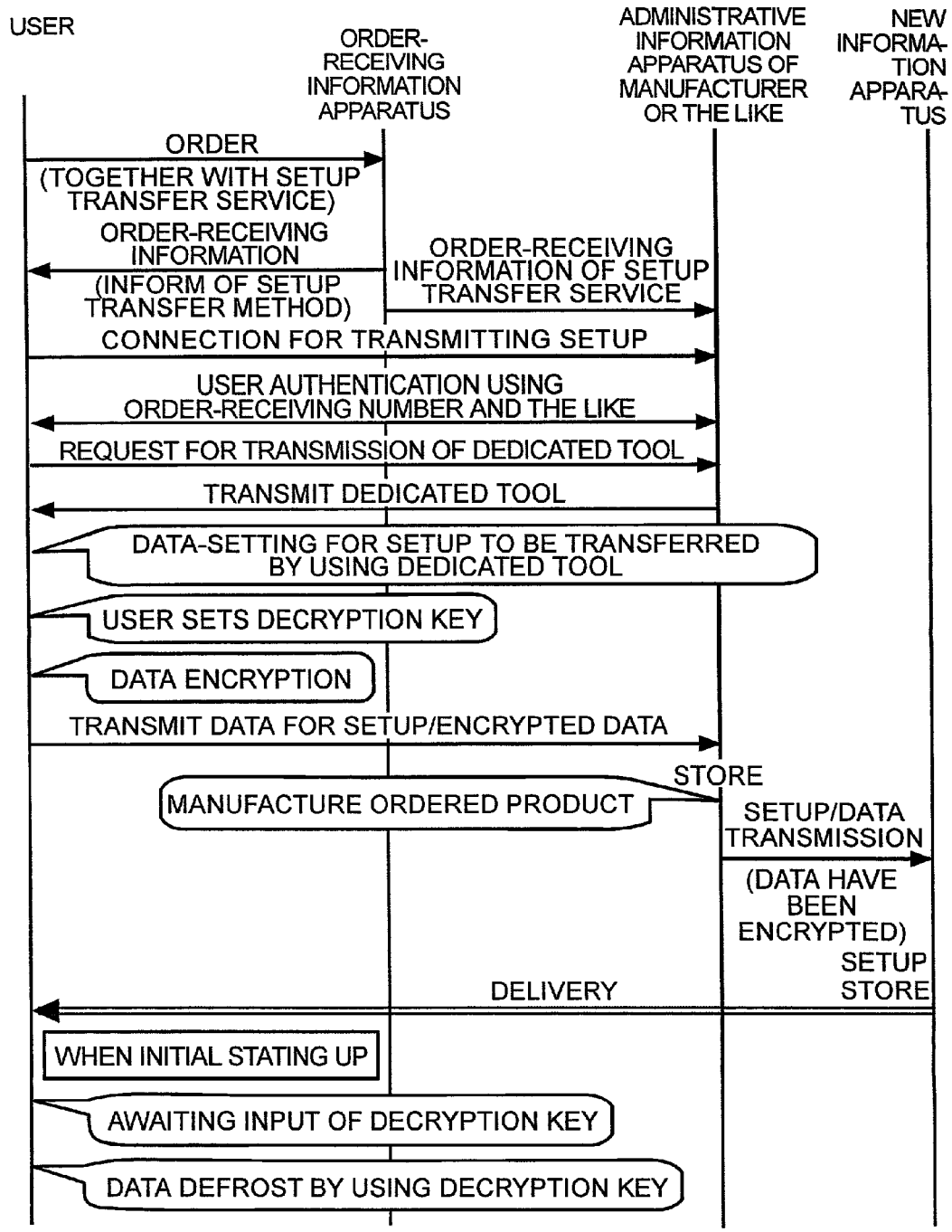
FIG. 8 is a diagram of a process flow between the user and the manufacturer when data is to be encrypted, according to another embodiment of the present invention.

In another embodiment of the invention, as shown in FIG. 8, the setup information and data to be transferred are encrypted for transmission from current apparatus 11 to administrative apparatus 17A. Information processing up to the step of selecting the setup information, data, and the like to be transferred using a dedicated transfer tool is the same as the processing in the embodiment described above. Here, before transmitting the setups and data to be transferred to the administrative apparatus 17A, the dedicated transfer tool prompts the user to input an encryption key, as shown in FIG. 9A. The user inputs the key (character string) for the encryption, and the setups and data to be encrypted undergo encryption when the user presses the "encrypt" button. Then, 1 the encrypted information are transmitted from the current apparatus 11 to administrative apparatus 17A via the network 16. Administrative apparatus 17A stores the encrypted setup information or data information in respective user information storage section 23e. In the production process of the new apparatus, administrative apparatus 17A transmits, sets up and stores the encrypted transfer contents stored in respective user information storage section 23e, with respect to the ordered apparatus, and then the new apparatus is delivered to the user. At the time of delivery, a function may be added, to the settings of the new apparatus for displaying an image as shown in FIG. 9B for inputting a decryption key for decrypting the encrypted information when the new information apparatus is started up. (Ordinarily, the screen is inputted at the first start up, but the image may be displayed multiple times until the decryption key is inputted), so that the user can use the new n apparatus with the transferred setups/data immediately after it is delivered, without having to worry about the encryption process.

Some users may hesitate to use the system of the aforementioned embodiment for information management reasons because the setups or data in current apparatus 11 are transmitted unencrypted to network 16 and administrative apparatus 17A in the embodiment. In turn, in the present embodiment, the data to be transferred are in the form of encrypted information in network 16, administrative apparatus 17A and new apparatus 19 until the user inputs the key for decryption, so that the setups and data are transferred with their security being ensured. In some cases, setups and data to be transferred include those that do not always require management in terms of security (for example, most data requires security management; however most setups do not require such high security management as encryption). In these cases, it is possible to encrypt only the setups and data that require security management for decryption later. For example, a part of the dedicated transfer tool shown in FIGS. 7A to 7D is enlarged in FIG. 9C. Using this screen, the user can select contents and data to be encrypted. In this example, the image for inputting the encryption key shown in FIG. 9A is displayed by pressing the "encrypt" key shown in FIG. 9C, and then the contents of areas selected in FIG. 9C are encrypted for transmission to the administrative apparatus 17A. The function of encryption and decryption in the present embodiment can be realized by using techniques typically used in information apparatus.

Figure 15:
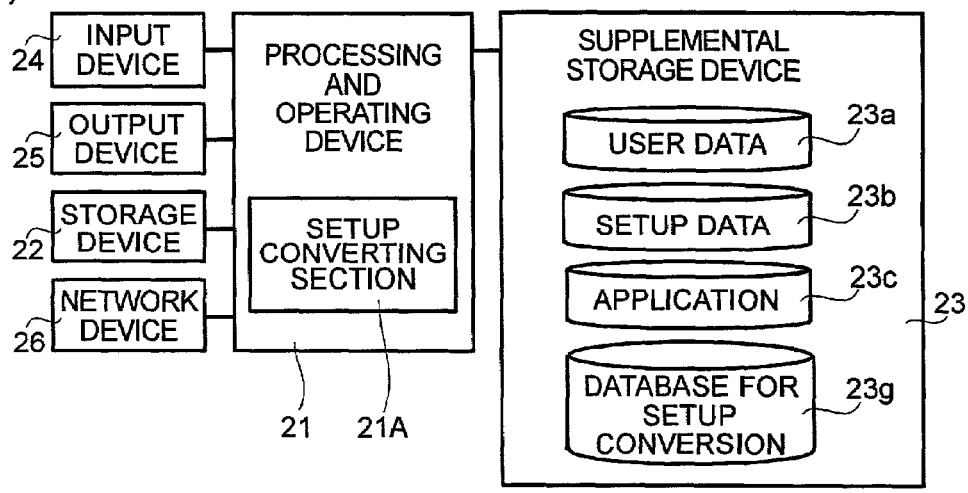
FIG. 15A is a diagram of a system configuration according to a third embodiment of the present invention.
FIG. 15B shows an example of database contents according to a third embodiment of the present invention.
Figure 16:
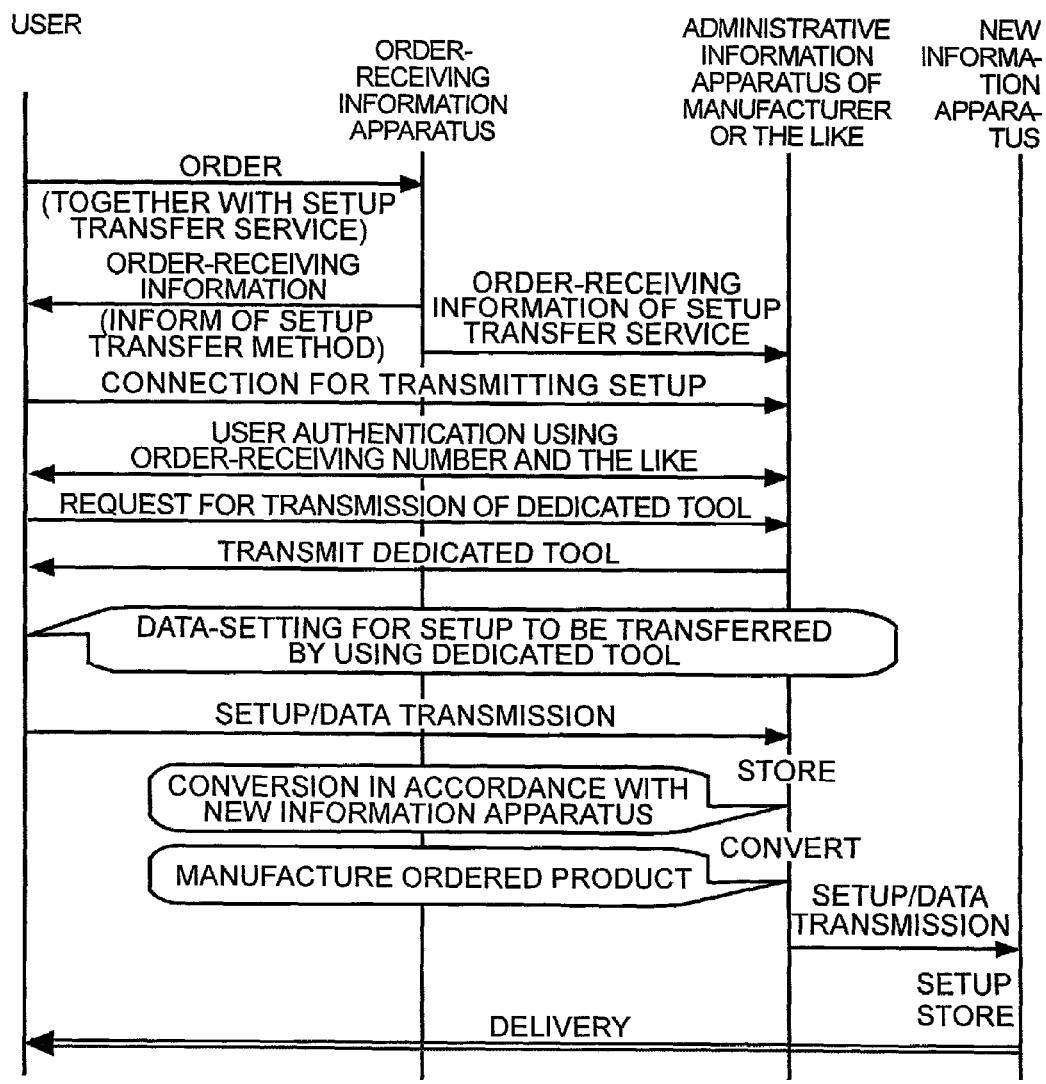
FIG. 16 is a diagram of a process flow between a user and a manufacturer according to the third embodiment of the present invention.

An embodiment of the invention, as shown in FIGS. 15A-16, provides a method for converting and transferring setup information from current apparatus 11 that cannot be used as it is by new apparatus 19.

FIG. 15A shows a system configuration of administrative apparatus 17A of the present embodiment. The system comprises a processing and operating device 21, such as a CPU typically provided in an information apparatus; a storage device 22, such as a semiconductor memory; a supplemental storage device 23, such as an HDD; an input device 24, such as a keyboard 13, a mouse 14 and so on; a display device 12, such as a monitor; an output device 25, such as a printer; and a network device 26, such as a modem or a LAN card. The processing and operating device 21 is provided with a setup conversion section 21a. The supplemental storage device 23 is provided with a user information management database 23d, a respective user information storage section 23e, and a setup conversion database 23g. Respective user information storage section 23e is provided with a user data storage section 23a that stores data for respective users, a setup data storage section 23b, and an application storage section 23c.

Setup conversion database 23g has, as shown by way of example in FIG. 15B, an application table and a setup storage table that are used for transferring an application setup file. The application table contains an application name (which does not have to be a name, per se, as long as the product can be specified by the designation), a version number, and a setup storage table name. The setup storage table lists storage locations in a setup file, the corresponding setup contents, and so on. In the example shown in FIG. 15B, application tables "APP-A Ver. 5.0" and "APP-B Ver. 6.0," respectively, have setup table names "APPA50" and "APPA60." In each of the tables, the storage location in a setup file is shown as the first item and the corresponding setup contents are shown as the second item. In the "APP-A Ver. 5.0", "Default Folder" is stored at "areas 1 to 256" and "Tool Bar" is stored at "areas 257 to 512". In the "APP-B Ver. 6.0", "Tool Bar" is stored at "areas 1 to 512" and "Default Folder" is stored at "areas 513 to 768".

In the case of installing "APP-B Ver. 6.0" in new i apparatus 19 the dedicated transfer tool recognizes the existence of the "APP-A Ver. 5.0" in the current apparatus, and extracts and transmits the setup file for that version. Meanwhile, information for installing "APP-A Ver. 6.0" is sent to setup conversion section 21a, which reads the setup conversion database 23g based on the installation information. Setup conversion section 21a then reads that setup data for "APP-A Ver. 5.0" are stored in the "APPA50" table, and setup data for the "APP-B Ver. 6.0" are stored in the "APPA60" table. After that, setup conversion section 21a finds that it is possible to extract the necessary setups by converting the columns 1 to 256 and the columns 257 to 513 of the setup table of "APP-A Ver. 5.0" into columns 513 to 768 and columns 1 to 512 of the setup table of "APP-B Ver. 6.0",respectively. In some cases, more complicated data conversion may be necessary such when the storage codes differ in each version. However, it is still possible to carry out the conversion in such cases by providing a conversion table for the storage codes in the setup conversion section 21a.

The flow for carrying out the above-described process is basically the same as those of the first embodiment (FIG. 3) and the second embodiment (FIG. 8), except setups, data and the like are transmitted to new apparatus 19 after converting them using the method above, and storing them in administrative apparatus 17A.

According to the method of the present embodiment, it is possible to transfer the setups, data and the like after appropriately converting them even when the versions of an OS or an application are different from each other, thereby greatly enlarging an area that can be precisely transferred. Thus, the mode of the present embodiment is effective for setup/data transfer processing in cases where a user purchases an information apparatus wherein a newer version of an application is installed or in cases where a user orders a newer version of an application at the same time an information apparatus is purchased.

A method for receiving an order wherein an upgrade of an application is requested is described below. In this example, transfer of an application is ordered when it is found that, after searching applications in current apparatus 11 using the above-described method, application "APP-A Ver. 5.0" is installed, and Ver. 6 is available as the newest version of "APP-A"., and the screen shown in FIG. 20A is displayed to offer the user an upgrade of the application. (By using the application table shown in FIG. 15B, or the like, a user can find out that Ver. 6 is available.) The screen shows the price for the upgrade and, if the user accepts, an order for the upgrade is sent with the order for the new information apparatus.

Applications generally differ in the capacity required for operation in an information apparatus. For example, an e-mail application, or the like, that handles only text data does not require a large capacity; however, an application that handles graphics requires a large throughput capacity. Required capacities or recommended capacities with respect to such applications are managed as in the exemplary table shown in FIG. 20B. In the table, information specifying am application is given as the first item, and information specifying the capacities required for operation of various applications in an information apparatus are given as the second and following items. After an application used in current apparatus 11 is extracted, as described above, the capacity required for an information apparatus to operate the application is extracted with reference to the table. For example, when current apparatus 11 uses "MAIL-A 6.0" and "Graph-C 4.0",the information extracted is "required CPU" of "400" and "1200", "required memory" of "64" and "512" and "required HDD" of "5" and "60" for the respective applications. The larger numerical value is extracted for each of the capacity items, and, thus, it is possible to determine that an information apparatus ordered by a customer requires a CPU of 1200, a memory of 512 and an HDD of 60.

In this example, the capacity of the information apparatus ordered by the customer is compared with the required capacity extracted from the application information. If the capacity of the ordered information apparatus is less than the required capacity, it is possible, using an the screen shown in FIG. 20C, to offer the customer a configuration of the information apparatus that permits efficient use the application. The CPU is used in the example in FIG. 20C; however, it is possible to adapt the above process to storage or the HDD. and/or a plurality of other items.

As described above, it is possible to offer the newest version of an application to a customer by transmitting to order-receipt apparatus 17 information about applications installed in current apparatus 11 together with an order for purchasing an information apparatus according to the present embodiment. Further, according to the present embodiment, it is possible to achieve consistency between the hardware capacity, the setup of the information apparatus the customer ordered, and an application the customer wants to purchase, thereby supporting the customer's decision not only by presenting the newest version of an application but also by referencing the hardware capacity of the information apparatus to be purchased.

Another embodiment of the invention provides a method of reliably erasing transfer contents, including setups, data, and the like, that are stored in administrative apparatus 17A, and is described below with reference to FIG. 10.

Figure 10:
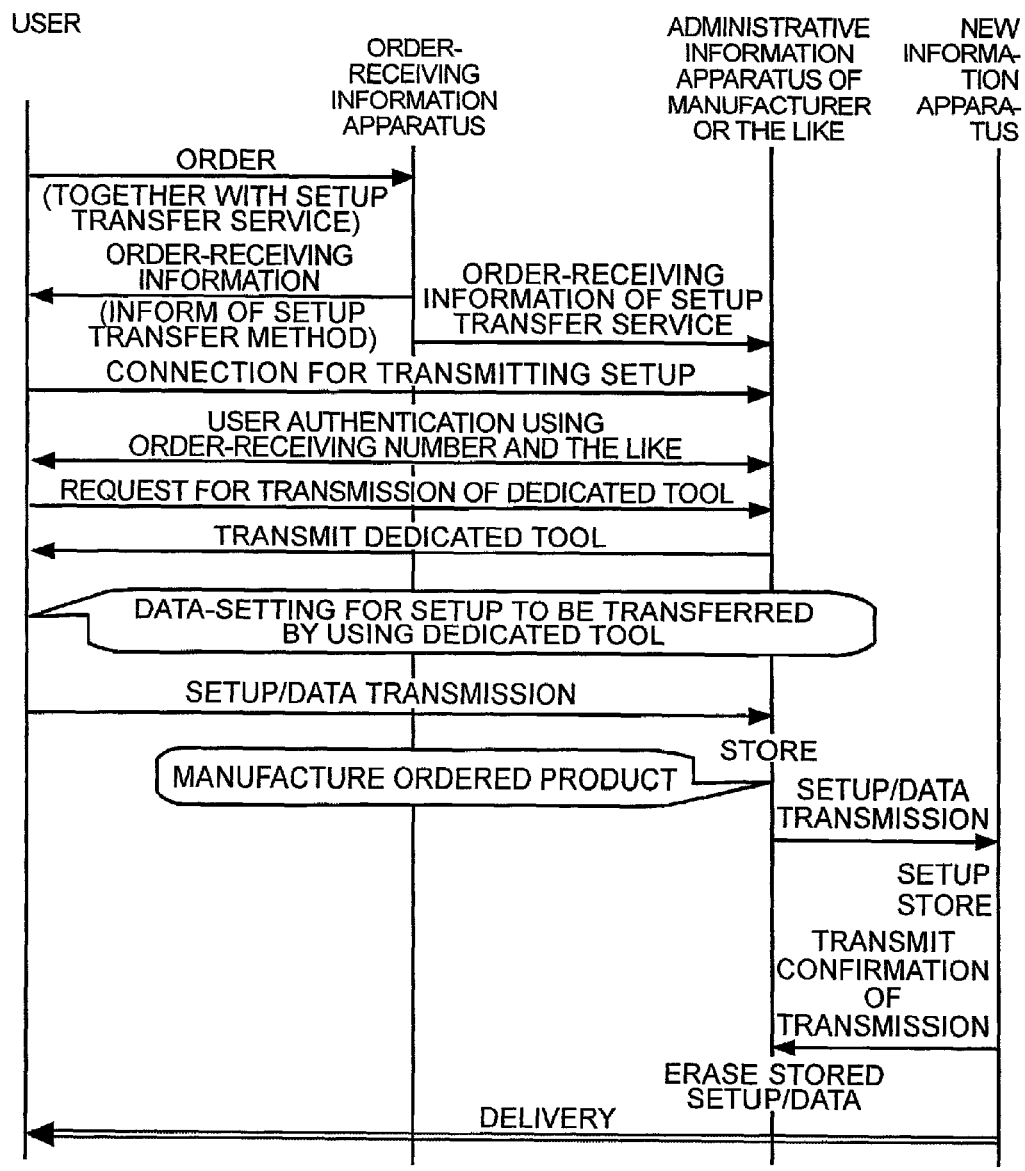
FIG. 10 is a diagram of a process flow between the user and the manufacturer when data is to be erased, according to a fourth embodiment of the present invention.

In FIG. 10, the process of transmitting setups, data and the like from a user to administrative apparatus 17A, and then transmitting, setting up and storing in the new apparatus 19 the contents stored in the respective user information storage section 23e of administrative apparatus 17A with respect to new apparatus, is the same as the process of FIG. 3. In this embodiment, however, once the contents are transmitted, set up and stored in new apparatus 19, the new apparatus, or an administrative apparatus that manages the production of the new apparatus, notifies administrative apparatus 17A that transfer of the setups, data, and the like, to new apparatus 19 has been completed. Upon receipt of this information, administrative apparatus 17a erases the transfer information containing the setups, data, and the like, that are stored in the respective user information storage section 23e allocated to new apparatus 19. Accordingly, this method increases data security.

In addition, the process of FIG. 10 that is the same as the process of FIG. 3, may be replaced by the relevant process of FIG. 8, so that it is possible to encrypt the contents transmitted from current apparatus 11 to administrative apparatus 17A, stored in the respective user information storage section 23e and then transmitted in encrypted form to the new apparatus 19. Further, the process of FIG. 10 that is the same as the process of FIG. 3 may be replaced by the relevant process of FIG. 16 so that the contents are converted when an OS, a version of an application, or the like, of the current information apparatus are different from those of the new information apparatus. 971 Another embodiment of the present invention, as shown in FIG. 11, provides a method of reliably erasing transfer contents stored in administrative apparatus 17A, including setups, data, and the like, upon confirming that the transfer has been correctly performed.

Figure 11:
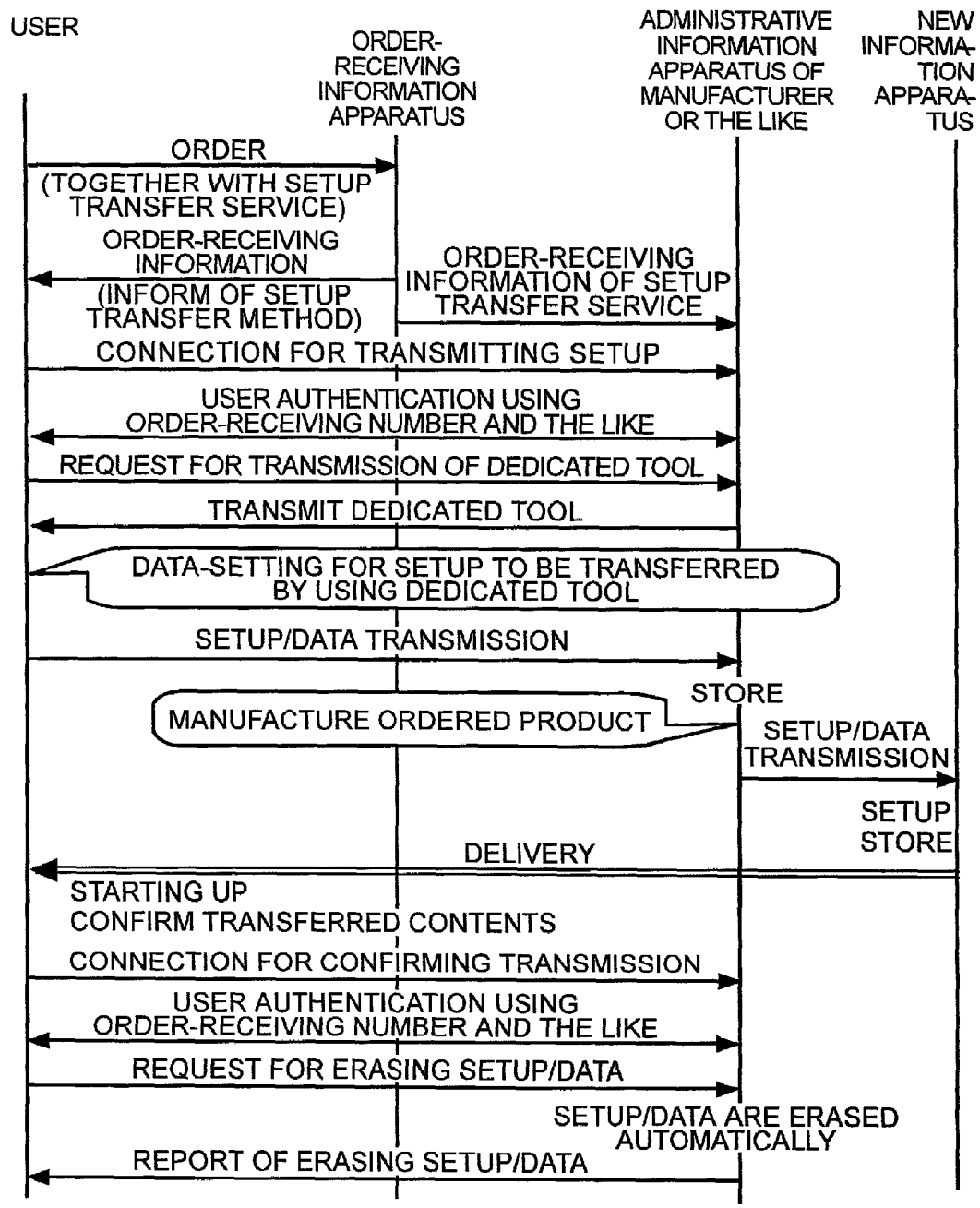
FIG. 11 is a diagram of a process flow between the user and the manufacturer when confirming transfer of data from one apparatus and subsequent erasure of data in another apparatus, according to a fifth embodiment of the present invention. 1431

The process shown in FIG. 11, from the step of transmitting setups, data, and the like, from a user to administrative apparatus 17A, to the step of transmitting, setting up and storing the contents stored in respective user information storage section 23e of administrative apparatus 17A with respect to new apparatus 1, is the same as the process of FIG. 3. But in the method of FIG. 11, the user starts up new apparatus 19 when it is delivered to confirm that the setups, data, and the like, have correctly transferred. Using new apparatus 19, the user confirms the correct transfer, by connection to administrative apparatus 17A via network 16. Settings for the connection, with respect to the new information apparatus 19, may be performed by a manufacturer/supplier prior to the connection or by providing the user with a document describing a method of connection when delivering new apparatus 19. This connection method is a conventional dial-up access to the Internet and does not need further description. Upon connection, a request for erasing the setups, data, and the like, is effected by a user's input via a screen, shown in FIG. 12A, informing administrative apparatus 17A of the correct transfer of the setups, data and the like. Administrative apparatus 17A searches respective user information storage section 23e allocated to the user, based on the user verification information at the connection, and unfailingly erases the setups, data, and the like, stored in the storage section.

According to the method of this embodiment, the transfer contents including the setups, data, and the like, are reliably erased from the storage section of administrative apparatus 17A when the user confirms that the contents have correctly transferred to the new information apparatus, and the security of the data is increased.

In addition, the portion of the process of FIG. 11 that is the same as the process of FIG. 3 may be replaced by the relevant processing of in FIG. 8, so that it is possible to encrypt the contents that are transmitted from current apparatus 11 to administrative apparatus 17A, stored in the respective user information storage section 23e, and then transmitted to new apparatus 19. Further, the portion of the process of FIG. 11 that is the same as the process of FIG. 3 may be replaced by the relevant process of FIG. 16 so that the contents are converted when an OS, a version of an application and the like of the current information apparatus are different from those of the new apparatus.

If the transfer contents, including setups and data in the new apparatus 1 have a default or an error, the user requests re-transmission, as shown in FIG. 12A. Administrative apparatus 17A again transmits the setups, data, and the like, stored therein to new apparatus 19 upon receiving "the request for re-transmission" from the user (new apparatus 19). Here, all of the setups, data, and the like, are transferred, or a user can employ a method wherein a list of the setups, data and the like stored in administrative apparatus 17A is displayed, as shown in FIG. 12B, and the user selects the items that need to be retransmitted. In both cases, administrative apparatus 17A has information about an area (for example, the area represented by a drive name and a folder name) that stores (transmits) setups, data, and the like, and, therefore, the transfer contents are transmitted to the area. It is also possible to perform the transmission by designating the area to which the contents are to be transmitted by displaying a screen for prompting the user to input such area with respect to every setup, datum, and the like.

Further, in the above embodiment, after checking the transfer contents, the user accesses administrative apparatus 17A via network 16 using the new information apparatus. This is the same process used for the method wherein the screen for inputting transfer confirmation (shown in FIG. 12C) automatically loads on new apparatus 19, and the user presses the confirmation of completion button on the screen to automatically access administrative apparatus 17A, via network 16, to erase the setups, data, and the like.

Another embodiment of the invention provides a method of transferring setups, data, and the like, using an administrative apparatus in a company where the current apparatus is a temporal storage apparatus. This embodiment is described with reference to FIGS. 13A to 15B.

FIG. 13A illustrates a general system configuration of the present embodiment. The system comprises a current apparatus 11 such as a personal information apparatus currently used by a user; a display device 12, such as a monitor; an input device, such as a keyboard 13 and mouse 14; an administrative apparatus at user's company 17B (hereinafter "administrative apparatus 17B) connected to current apparatus 11 via an internal network at user's company 18A (hereinafter "internal network 18A"), such as a LAN for current apparatus 11; an order-receipt apparatus 17 for managing order information at a manufacturer/supplier's location; an administrative apparatus 17A for managing transfer information at the manufacturer/supplier's location; a new apparatus 19; a network 16, such as a telephone line for connecting current apparatus 11 with the order receipt apparatus 17A; and an internal network 18, such as a LAN for connecting the order receipt apparatus 17, the administrative apparatus 17A and the new apparatus 19. Current information apparatus 11, order receipt apparatus 17, administrative apparatus 17A, administrative apparatus 17B and new apparatus 19 are connected to one another on a one-to-one basis, as shown in FIG. 13; however, a plurality of sets of each of the apparatuses may be used. Network 16, internal network 18 and internal network 18A are not necessarily connected via a wire communication. In particular, internal network 18 may be replaced by a recording medium inside the manufacturer/supplier's system to realize the same function. A system configuration of administrative apparatus 17B is the same as that of administrative apparatus 17A shown in FIG. 2C.

Figure 14:
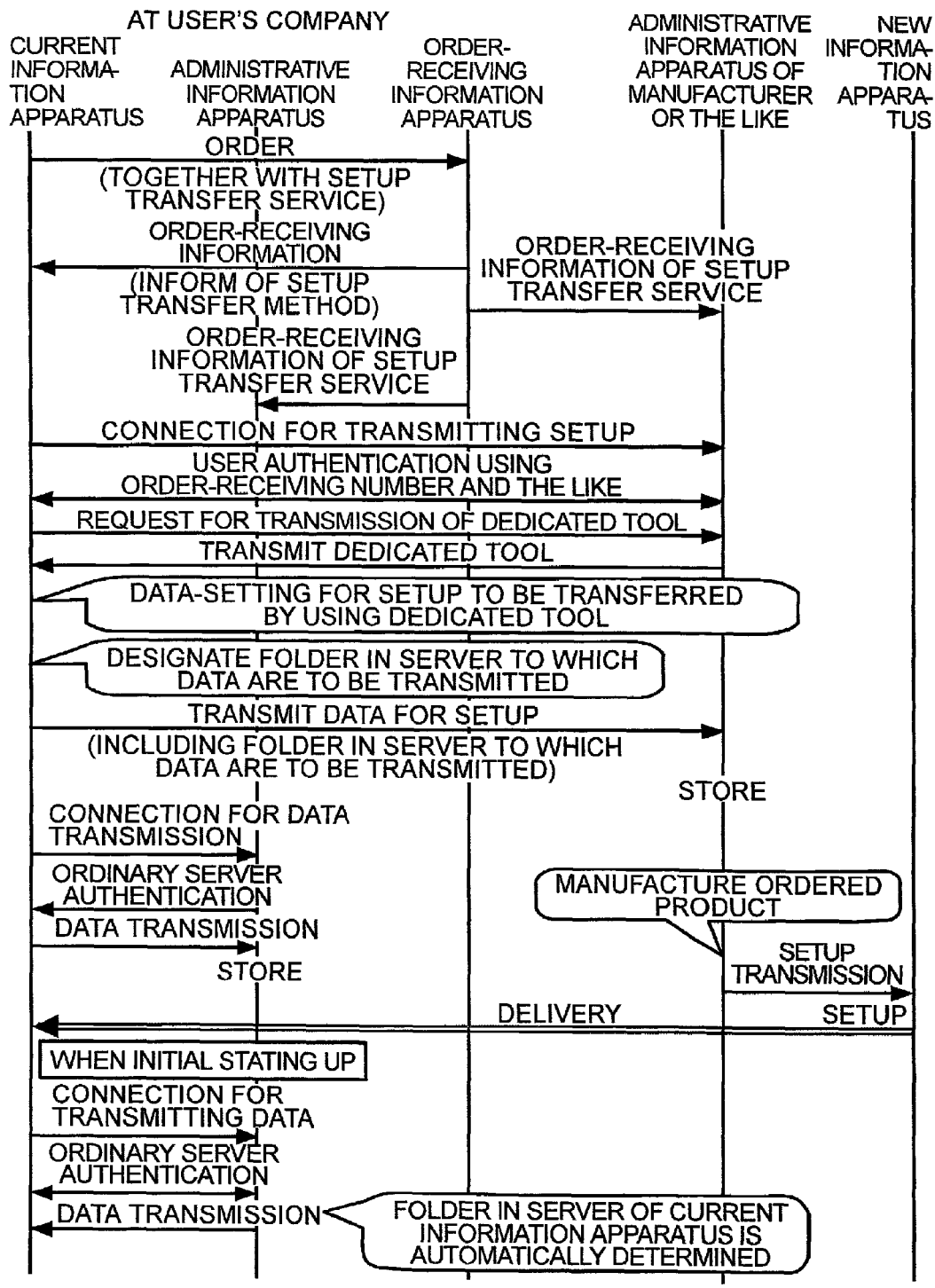
FIG. 14 is a diagram of a process flow between a user's company and a manufacturer according to the sixth embodiment of the present invention.

FIG. 14 shows a general process flow of the present embodiment. The user of the current information apparatus orders a new information apparatus to replace or augment the current information apparatus, sending purchase order information to order receipt apparatus 17 of the manufacturer. In this example, a setups transfer service or a data transfer service is ordered with the new information apparatus, as shown in FIG. 4, and order receipt apparatus 17 registers the while simultaneously displaying the purchase order for the user (complete with the order information for the setup/data transfer service), as shown in FIG. 5. Order receipt apparatus 17 transmits the order information to administrative apparatus 17A, which stores the information in user information management database 23*d*. Further, the user accesses the administrative apparatus via network 16 and provides user verification information in order to download a dedicated transfer tool. It is possible to perform the aforementioned process in the same manner used in the first embodiment.

Next, the user of the current information apparatus designates setups, data, and the like, to be transferred dedicated transfer tool. The method of designation is the same as used in the first embodiment. When the start transfer button shown in FIG. 7A is pressed, a screen, as shown in FIG. 13Bm is displayed to designate an area for storing contents that the user does not want transmitted to or stored in administrative apparatus 17A via network 16. for transfer to administrative apparatus 17B via internal network 18A at the user's company. Here, it is possible to improve the efficiency of the designation by displaying a screen, as shown in FIG. 13C, on current apparatus 11, on which a list of storage areas in administrative apparatus 17B, or a list of areas contained therein, appears. The user then selects a storage area using the select button on the screen. An internal LAN, often provided at companies (an "intranet," or the like) may serve as internal network 18A, and a server at the user's company may be used as administrative apparatus 17B. The server verification performed in this example is the same as that typically performed for connecting a typical information apparatus to a server at a company and, thus, it is possible to manage the server verification by using a user name and a password. Administrative apparatus 17B can administrate setups, data, and the like, for respective users by allocating an accessible area each of user, thereby facilitating the transmission of setups, data, and the like to new apparatus 19.

The dedicated transfer tool serves to transmit setups, data, and the like, stored in administrative apparatus 17B to the designated area, and administrative apparatus 17B stores the setups, data, and the like, in the respective user information storage section 23*e*. Further, the dedicated transfer tool transmits information that can be sent to the administrative apparatus via network 16. In this case, information about the designated area information in administrative apparatus 17B and setup information for accessing administrative apparatus 17B are also transmitted. The information includes, for example, a name and an address for new apparatus 19 on internal network 18A at the user's company, various items for accessing the network, a name for administrative apparatus 17B on internal network 18A at the user's, a user name and a password (which may be inputted manually) that are required for access, a name for the storage area on e internal network 18A at the user's company, and the like. Administrative apparatus 17A at the manufacturer/suppler, stores the transmitted information containing the designated area information in the respective user information storage section 23*e*.

Then, at the step of producing the new information apparatus, administrative information apparatus 17A transmits, sets up, and stores the contents stored in the respective user information storage section with respect to the new apparatus. At this point, the designated area information in stored in respective user information storage section 23*e* of administrative apparatus 17B is also stored in the newly purchased apparatus to be delivered to the user. It is particularly important to perform initialization with respect to the name and the address used for new apparatus 19 on the internal network 18A at the user's company as well as the various setup items for accessing to the network.

The user accesses administrative apparatus 17B (automatically connected if the user name and password required for the access are stored, or the user name and password may be inputted manually) in accordance with predetermined contents (the name of administrative apparatus 17B on internal network 18A, or the like) when starting up the new apparatus (usually at an initial start up, but may be started up many times, until the data is restored). Then the user information, such as setups, data, and the like, is automatically transmitted to the new apparatus from the designated area of administrative apparatus 17B in accordance with predetermined contents (the name of for the storage area on the internal network 18A, or the like).

The setups, data, and the like, are basically transmitted to an area of the new apparatus that is equivalent to an area of the current apparatus; however, it is also possible to designate an area to which the setups and the like are transferred by displaying a screen for designating the area, as needed.

According to the present invention, a user can use the new immediately after delivery as long as the setups, data, and the like, including setups, data, and the like, that must not be disclosed to others via a network or the like, have already been transferred to the new apparatus. Specifically, it is possible to maintain the confidential setups, data and the like in a server at the user's company for transferring such setups, data, and the like without concern about information leakage.

Figure 17:
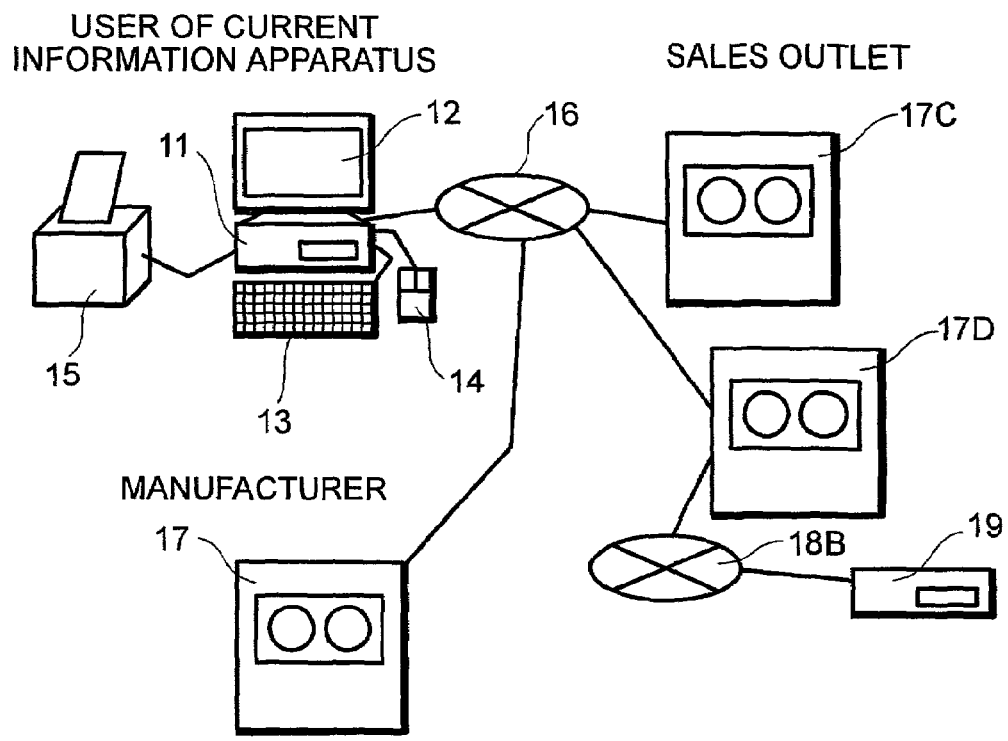
FIG. 17 is a diagram of a general configuration of an apparatus and an image displayed thereon according to a seventh embodiment of the present invention.
Figure 18:
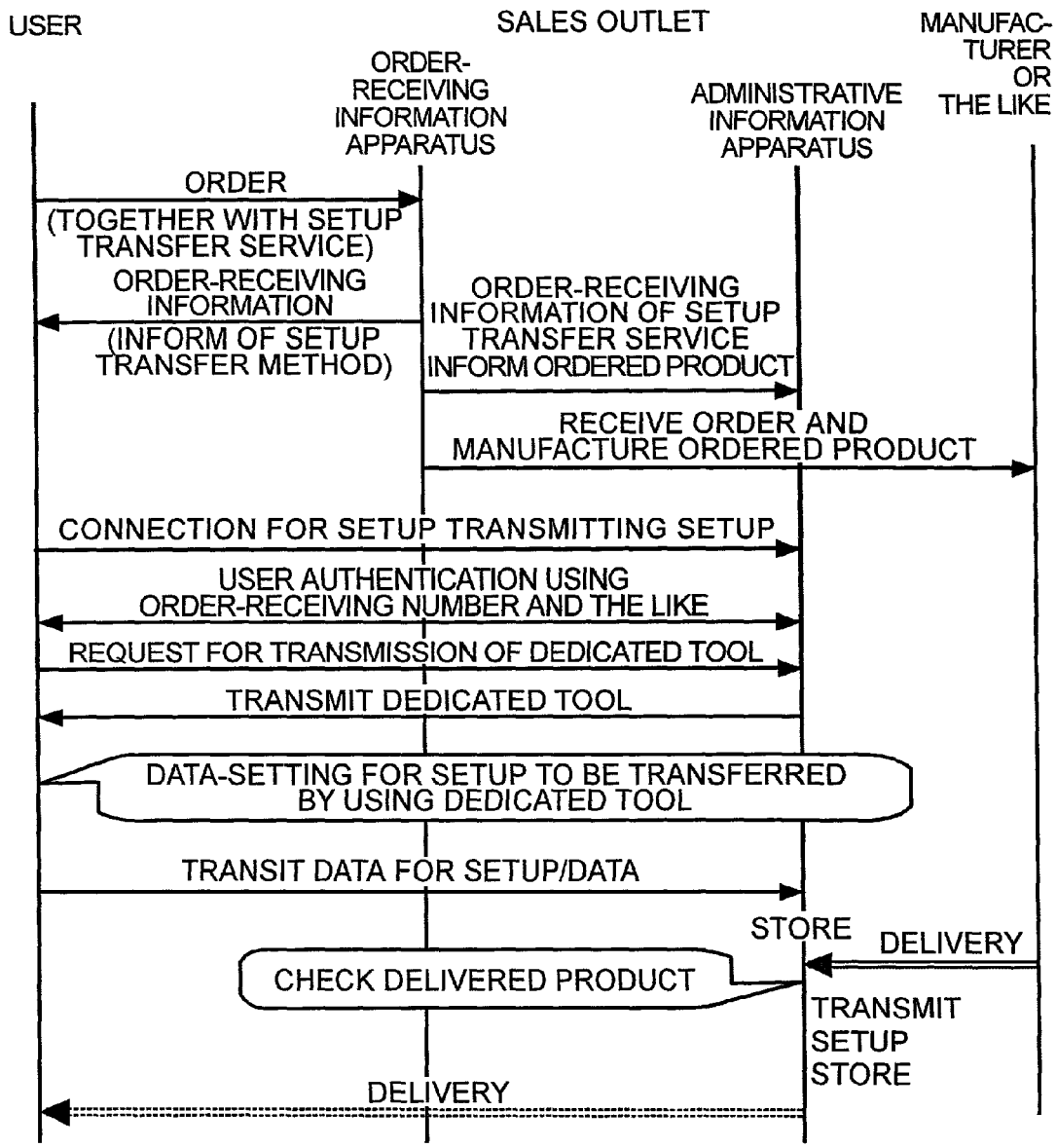
FIG. 18 is a diagram of process flow between a user and a sales outlet, and the sales outlet and a manufacturer, according to the seventh embodiment of the present invention.
Figure 21:
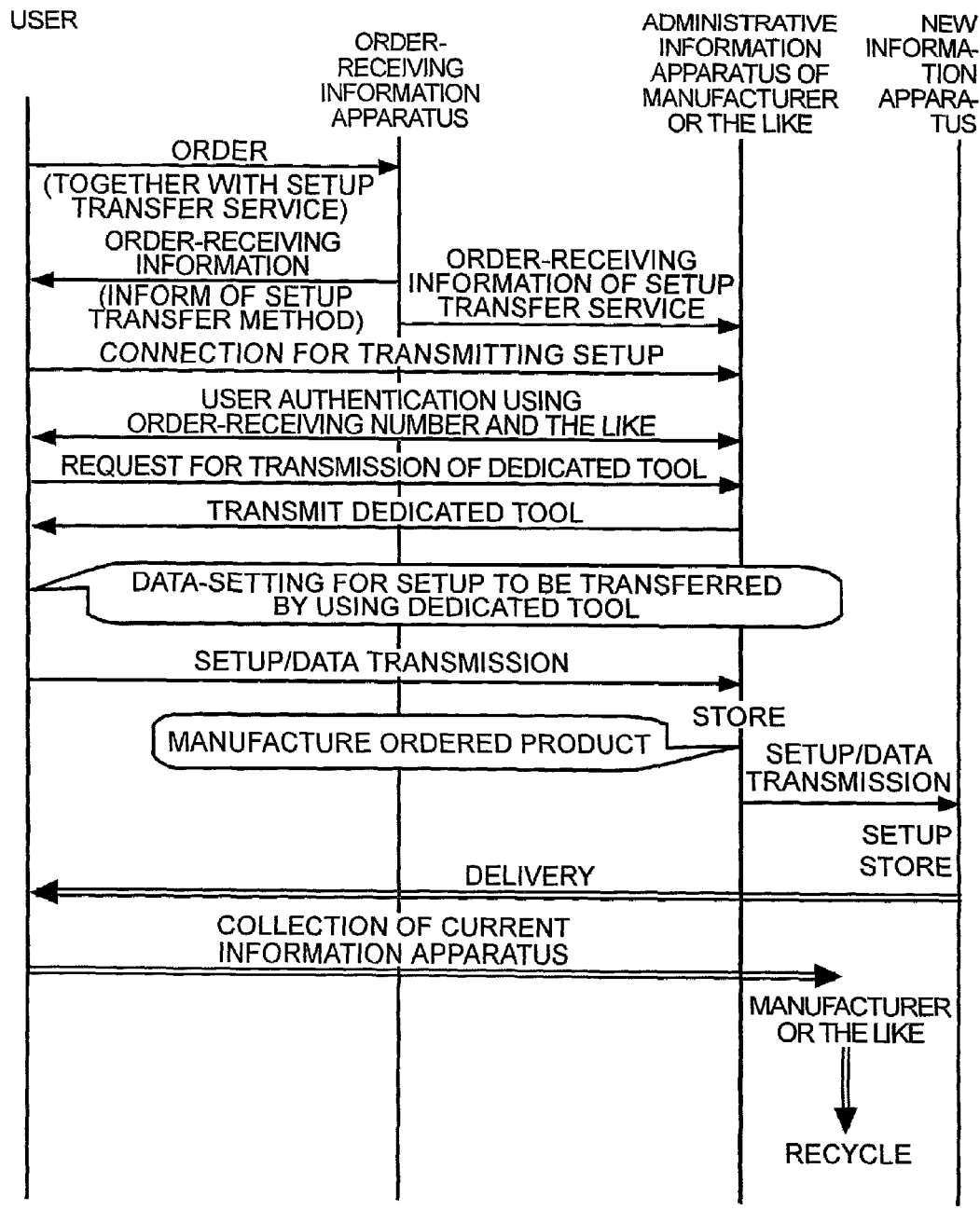
FIG. 21 is a diagram of a process flow of a server on the manufacturer's premises that links a user and a manufacturer, according to an eighth embodiment of the present invention.

In another embodiment of the invention, shown in FIGS. 17 and 18, a method is provided wherein a sales outlet or a service provider handling orders and orders receipts transfers the setups, data, and the like.

FIG. 17 shows a general system configuration of the present embodiment. The system comprises, at a current apparatus user's location, a current information apparatus 11, such as a personal information apparatus that is currently used by a user; a display device 12, such as a monitor; and an input device, such as a keyboard 13 and mouse 14; and at a sales outlet, an order receipt apparatus 17C for managing order information; an administrative apparatus 17A for managing transfer information; a new apparatus 19; a network 16, such as a telephone line for connecting current information apparatus 11 to the order receipt apparatus17C or administrative apparatus 17D; an internal network 18B, such as a LAN for connecting order-receipt information apparatus 17C, administrative apparatus 17D, and new apparatus 19; and at a manufacturer, an order receipt apparatus 17 for managing order information. In addition, current apparatus 11, the order receipt apparatus 17C at a sales outlet, administrative information apparatus 17D at a sales outlet, new apparatus 19, and order receipt apparatus 17 at the manufacturer are connected on a one-to-one basis, as shown in FIG. 17; however, a plurality of sets of each of the apparatuses may be used. Further, network 16 and internal network 18B at a sales outlet are not necessarily connected via a wire communication. Specifically, internal network 18B can be replaced by a recording medium inside the sales outlet to realize the same function.

The system configuration for the system at the sales outlet may be the same as the configuration for the system at the manufacturer, as shown in FIGS. 2A to 2C.

FIG. 18 shows a general process flow of the present embodiment.

The user of the current information apparatus places an order for a new information apparatus to replace or augment the current information apparatus, sending the information to the order receipt apparatus 17C at a sales outlet. In this example, a setups transfer service or a data transfer service is ordered with the the new information apparatus, as shown in FIG. 4. Order receipt apparatus 17C at the sales outlet informs the user of the received order information (including procedural information about the setup/data transfer service), and registers the order at the same time, as shown in FIG. 5. Order receipt apparatus 17C, at a sales outlet transmits the received order information to administrative apparatus 17D, also at the sales outlet, and administrative apparatus 17D stores the information in user information administrating database 23d. Order receipt apparatus 17C transmits the product portion of the order information via network 16, to order receipt apparatus 17 at the manufacturer. Further, the user accesses administrative apparatus 17D via network 16 on completing user verification to download a dedicated transfer tool. The user sets[selects?] setups, data, and the like, to be transferred to the dedicated transfer tool for transmission to administrative apparatus 17D, and administrative information apparatus 17D stores the setups, data, and the like, in respective user information storage section 23e. It is possible to perform the aforementioned process in the same manner as that of the first embodiment, except that the user connects to the sales outlet, and the dedicated transfer tool, which is the same as the one used in the first embodiment, may be used to realize the aforementioned function.

The sales outlet checks information apparatuses delivered from the manufacturer to to identify the new information apparatus for which the user ordered the transfer service for setups, data, and the like, and then transmits the transfer contents for the setups, data, and the like, stored in respective user information storage section 23e to the new information apparatus via internal network 18B, so that the contents are set for and stored in the information apparatus. Next, the sales outlet delivers the new information apparatus to the user.

In addition, it is possible to carry out the method of transferring setups, data, and the like, after encrypting the that information, as described with reference to FIG. 8; the method of transferring setups, data, and the like, and storing a portion of that information in an apparatus on an internal network of a user, as described with reference to FIGS. 13A to 13C; the method of converting, as needed, a portion of the setups, data, and the like, to be transferred from current apparatus 11 to new apparatus 19, as described in FIG. 16, and by combinations of these methods.

According to the present invention, a user can immediately use an information apparatus purchased to replace or augment a currently used information apparatus when setups and data have been transferred thereto from the currently used information apparatus before the new information apparatus is delivered to the user. Further, because performing the setup or data transfer is time-consuming and difficult for a user, sales outlets can achieve an increase in sales opportunities and an increase in sales revenues by providing a transfer service for the user.

A further embodiment of the invention that provides a method for ordering "equipment recycling service" directed to current 11, at the same time the order for a new information apparatus is placed, is described below with reference to FIGS. 4A to 4D and FIG. 21. The equipment recycling service is ordered in addition to transfer service for setups, data, and the like, when ordering a new information apparatus using a screen shown in FIG. 4D.

The current information apparatus 11 is collected from the user for recycling when the new information apparatus 19 has been delivered, once the transfer of setups, data, and the like has been completed. In addition, process flow after receiving the order of the services is described with reference to FIG. 3; however, this process flow may be replaced by that shown in FIGS. 8, 9, 11, 14 and 16.

Generally, the setups, data, and the like, are left in the current information apparatus; therefore, it is difficult to abandon a current information apparatus immediately after the delivery of a new information apparatus. Moreover, such difficulty seemingly impedes an excellent recycling process from a physical distribution viewpoint, where collection of the current information apparatus would have the advantage of taking place with delivery of the new information apparatus.

According to the present invention, when a new information apparatus is purchased to replace a currently used information apparatus, the user receives the new information apparatus with the setups and data from the currently used information apparatus already transferred thereto and immediately usable upon delivery. The user can abandon the used information apparatus without delay, so that it is possible to collect the used information apparatus at the time of delivery of the new information apparatus, thereby enhancing physical distribution efficiency.

According to the present invention, when a new information apparatus is purchased to replace or augment a currently used information apparatus, the new information apparatus is delivered to the user in a state where the setups and data are already transferred thereto from the currently used information apparatus, or in a state that makes possible the transfer of setups, data, and the like, immediately after the delivery of the new information apparatus, thereby making it possible for the user to use the new information apparatus immediately upon delivery, without having to take the time to transfer the setups, data, and the like.

Further, in the case of collecting an information apparatus for recycle, the present invention enables the new information apparatus to be delivered in a state where setups and data from the current information apparatus are already transferred thereto, thereby making it possible to collect the current information apparatus when delivery of the new information apparatus. Thus, the present invention improves the convenience and efficiency of the equipment recycling as well as packaging recycling, and provides advantages over conventional methods where it is difficult to collect the current information apparatus at the same time with delivery of the new information apparatus because required information must be transferred through a time-consuming and sometimes complex, or confusing, process.

What is claimed is:

1. A method for providing a newly purchased information apparatus which replaces or augments a customer's current information apparatus comprising:

a manufacturer information apparatus of a manufacturer accepting an order for purchasing a new information apparatus to replace or augment the current information apparatus, and accepting a request for transfer servicing;

in response to receiving the request for transfer servicing, transmitting order-receipt information and a dedicated program tool to the current information apparatus via a communication network, the dedicated program tool executes on the current information apparatus to perform steps of:

determining configuration information stored on the current information apparatus including setup information, installed applications, and user data;

obtaining from a user information relating to transfer of at least some of the configuration information;

obtaining from the user private information stored on the current information apparatus exclusive of the configuration information; and storing the private information in an administrative information apparatus managed by an organization to which the user belongs;

the manufacturer information apparatus receiving from the dedicated program tool the configuration information and access information for accessing the private information stored in the administrative information apparatus, and storing the configuration information and the access information in a user information area;

producing the new information apparatus;

configuring the new information apparatus including transferring the configuration information from the user information area to the new information apparatus; and wherein when the user received the new information apparatus, the private information is installed thereinto in accordance with the access information to complete installation of the new information apparatus.

2. The method of claim 1 further comprising the manufacturer information apparatus receiving confirmation of completion of installation of the new information apparatus and then deleting data stored in the user information area to ensuring the user's security.

3. The method of claim 1 further comprising:

the manufacturer information apparatus receiving from the new information apparatus confirmation that the configuration information and the private information have been installed; and the manufacturer information apparatus deleting the configuration information and the access information that is stored the user information area upon receiving the confirmation.

* * * * *